United States Patent
Ichimaru et al.

(10) Patent No.: US 8,847,738 B2
(45) Date of Patent: Sep. 30, 2014

(54) MOBILE TERMINAL, INFORMATION PROCESSING METHOD, AND COMPUTER PROGRAM

(75) Inventors: Norihiro Ichimaru, Kanagawa (JP);
Takashi Suzuki, Kanagawa (JP);
Tetsunoshin Anzai, Tokyo (JP);
Toshimitsu Higashikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 13/186,555

(22) Filed: Jul. 20, 2011

(65) Prior Publication Data

US 2012/0032789 A1  Feb. 9, 2012

(30) Foreign Application Priority Data

Aug. 4, 2010  (JP) ................................ P2010-175638

(51) Int. Cl.
*H04Q 5/22* (2006.01)
*G06K 7/10* (2006.01)
*G06Q 20/32* (2012.01)
*G06Q 20/34* (2012.01)

(52) U.S. Cl.
CPC ........ *G06K 7/10237* (2013.01); *G06Q 20/3278* (2013.01); *G06Q 20/3226* (2013.01); *G06Q 20/357* (2013.01)
USPC .......... 340/10.5; 340/10.1; 235/375; 235/380

(58) Field of Classification Search
USPC ............................................... 340/10.1, 10.5
See application file for complete search history.

(56) References Cited

U.S. PATENT DOCUMENTS

| | | | |
|---|---|---|---|
| 8,126,806 B1 * | 2/2012 | DiMartino et al. | 705/41 |
| 8,275,312 B2 * | 9/2012 | Fisher | 455/41.2 |
| 2007/0238475 A1 * | 10/2007 | Goedken | 455/512 |
| 2007/0278290 A1 * | 12/2007 | Messerges et al. | 235/380 |
| 2009/0050688 A1 * | 2/2009 | Kon et al. | 235/375 |
| 2009/0130974 A1 * | 5/2009 | Yoneda | 455/7 |
| 2009/0143104 A1 * | 6/2009 | Loh et al. | 455/558 |
| 2009/0191812 A1 * | 7/2009 | Teruyama et al. | 455/41.1 |
| 2009/0247077 A1 * | 10/2009 | Sklovsky et al. | 455/41.1 |
| 2010/0213253 A1 * | 8/2010 | Wollbrand et al. | 235/380 |
| 2010/0240304 A1 * | 9/2010 | Ishibashi | 455/41.2 |
| 2011/0053501 A1 * | 3/2011 | Teruyama | 455/41.1 |
| 2012/0034868 A1 * | 2/2012 | Fine et al. | 455/41.1 |

FOREIGN PATENT DOCUMENTS

| | | |
|---|---|---|
| JP | 3695464 A | 9/2005 |
| JP | 2007-034973 A | 2/2007 |
| JP | 2009-147845 A | 7/2009 |

* cited by examiner

*Primary Examiner* — Nabil Syed
*Assistant Examiner* — Adnan Aziz
(74) *Attorney, Agent, or Firm* — Sony Corporation

(57) ABSTRACT

A mobile terminal includes a contactless communication unit configured to conduct contactless communication with an external communication apparatus, a plurality of memory units configured to store information to be transmitted to the communication apparatus, and a controller configured to control communication with the communication apparatus and set a priority order for the plurality of memory units when transmitting information from the plurality of memory units to the communication apparatus. The controller sets the priority order depending on the current time.

27 Claims, 20 Drawing Sheets

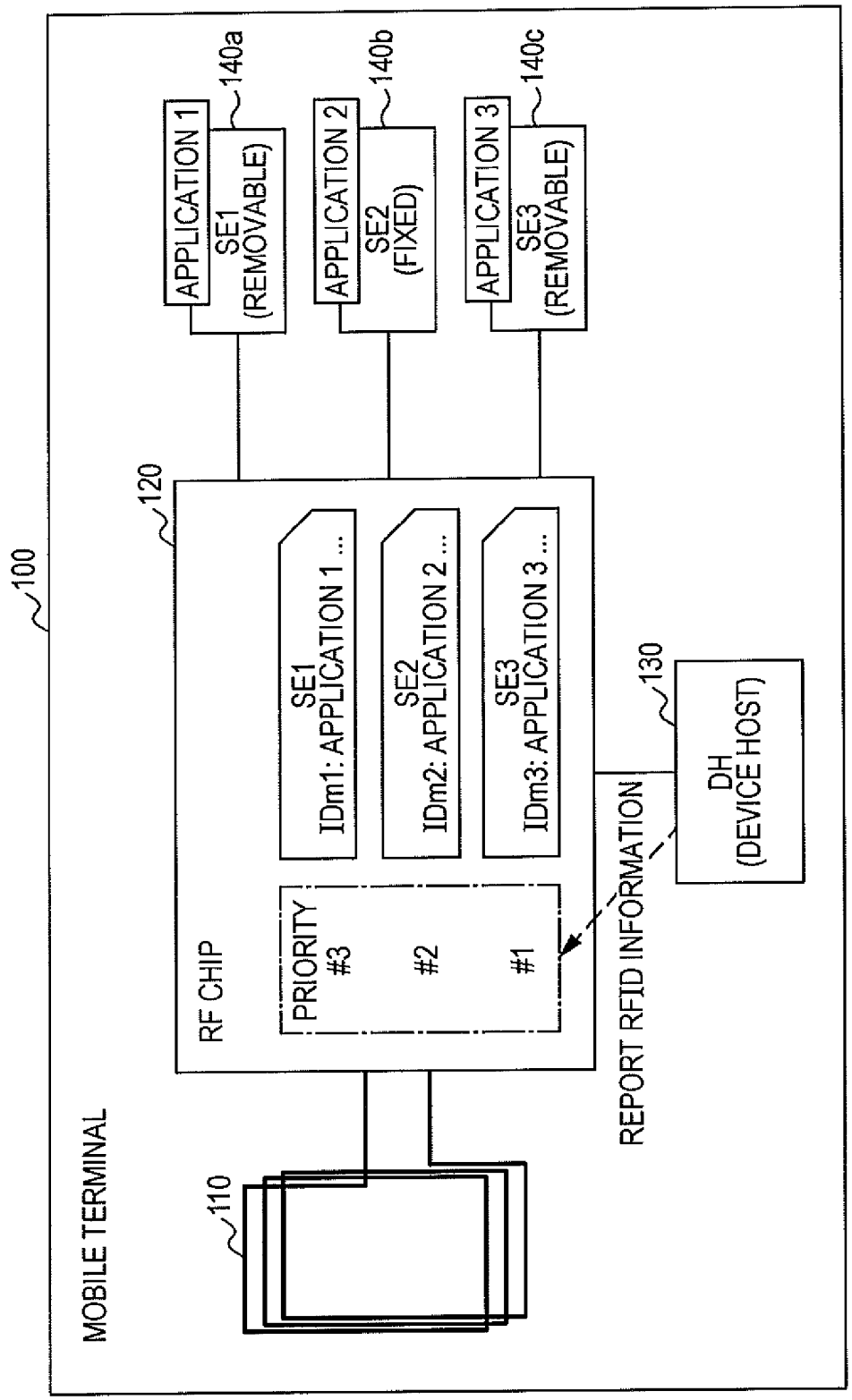

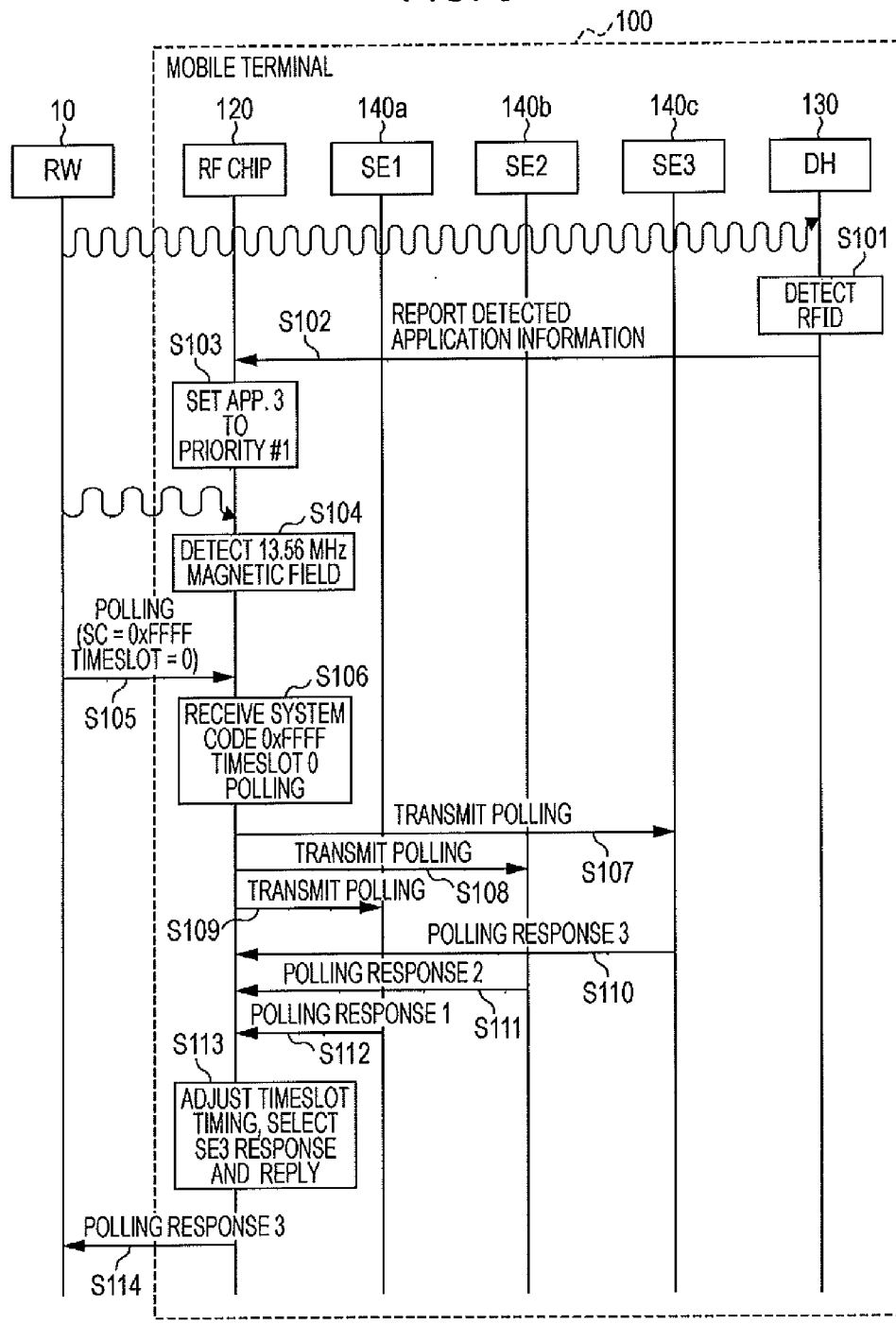

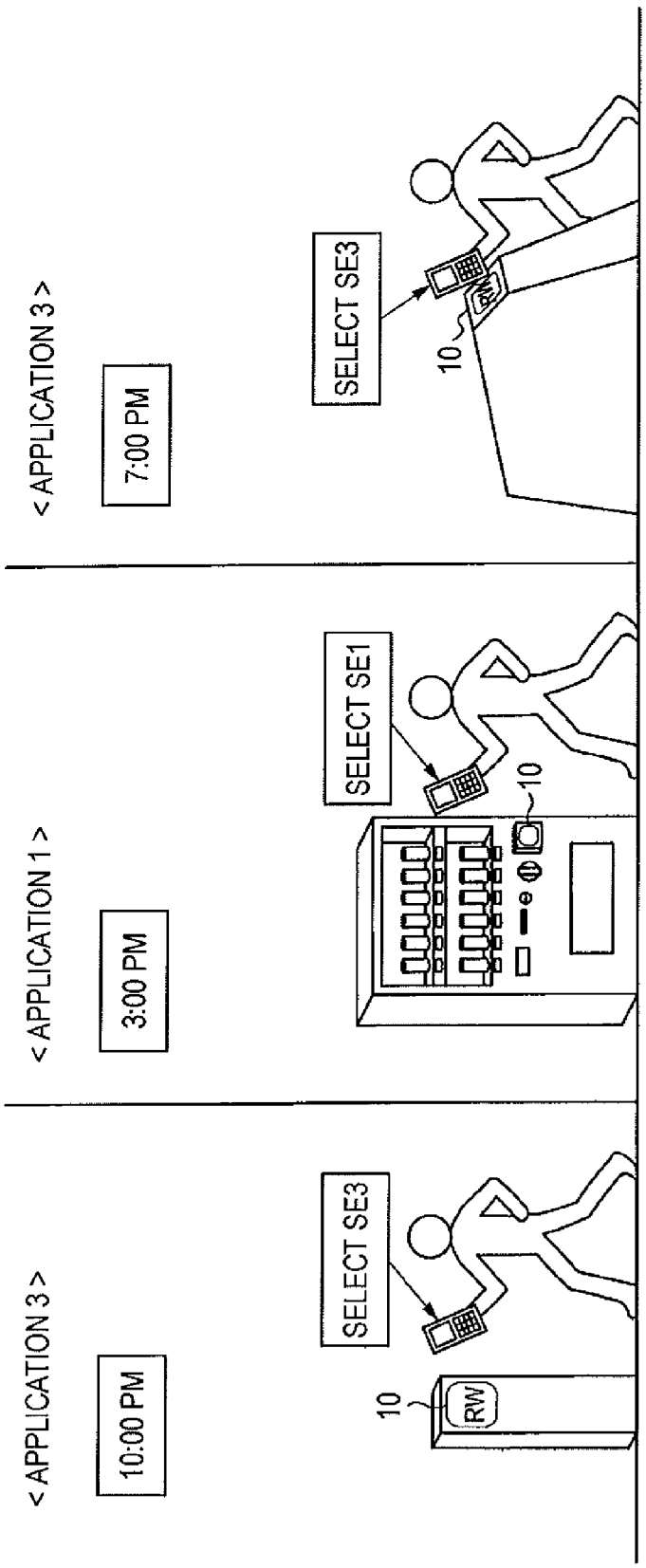

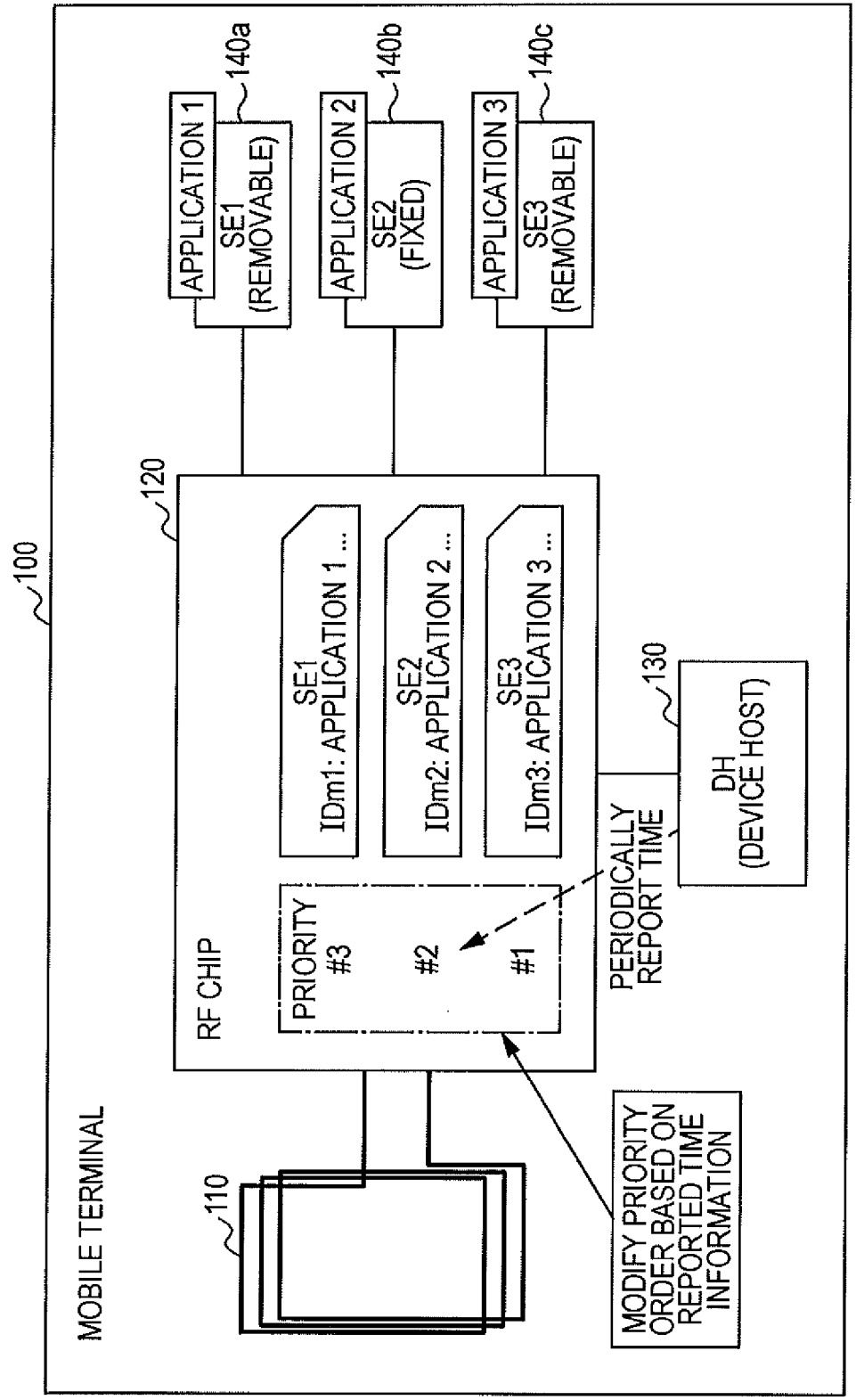

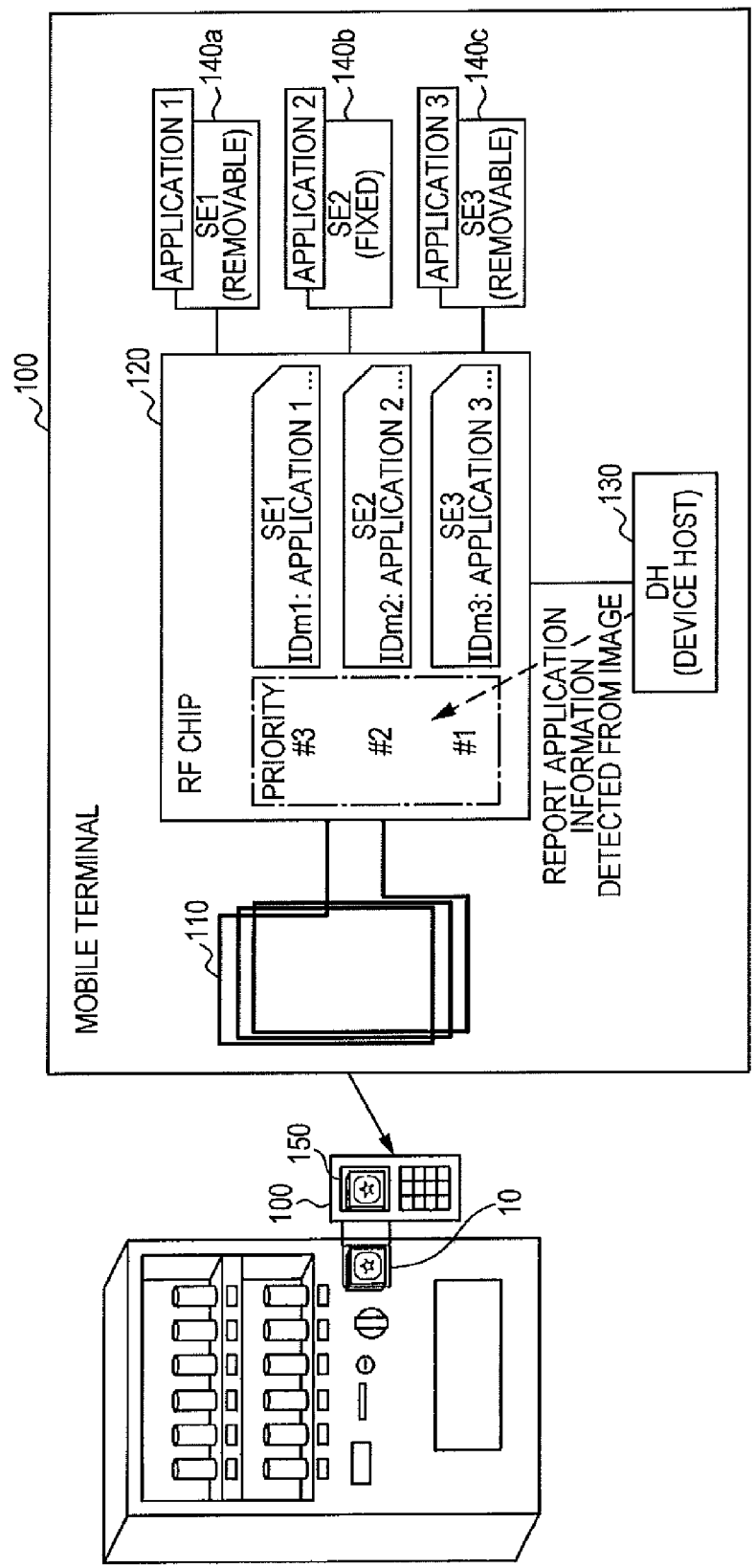

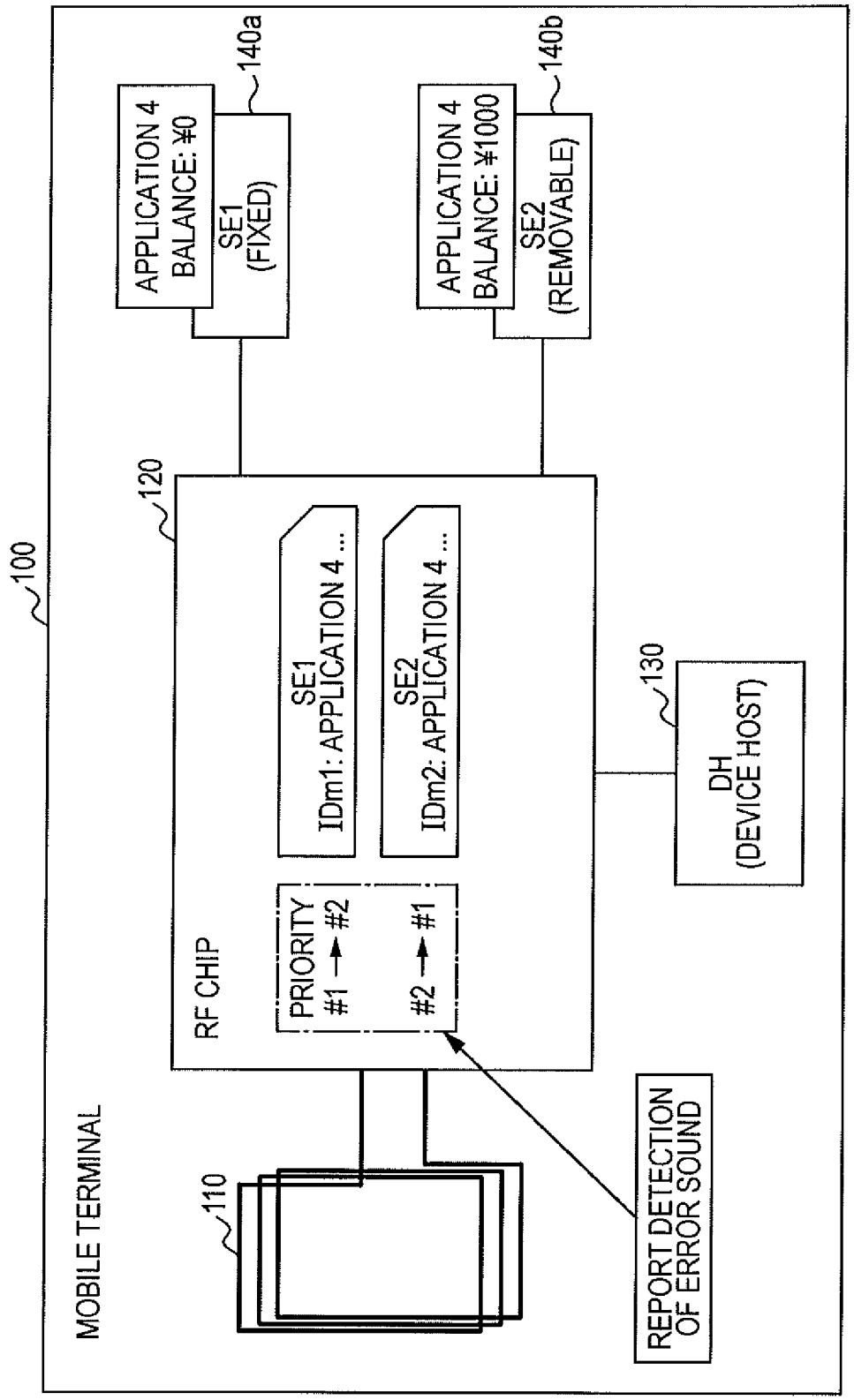

MOBILE TERMINAL, INFORMATION PROCESSING METHOD, AND COMPUTER PROGRAM

CROSS-REFERENCE TO RELATED APPLICATION

The present application claims priority from Japanese Patent Application No. JP 2010-175638 filed in the Japanese Patent Office on Aug. 4, 2010, the entire content of which is incorporated herein by reference.

BACKGROUND

The present technology relates to a mobile terminal, an information processing method, and a computer program.

Technology related to near field communication (NFC) by electromagnetic induction using a single-frequency carrier wave has been proposed (see Japanese Patent No. 3695464, for example). If a plurality of other devices contemporaneously communicate with a single device in the case where a single-frequency carrier wave is used, collisions occur, and the single device becomes unable to effectively receive signals from other devices. Consequently, in Japanese Patent No. 3695464, each device is configured generate its own RF field after first confirming that another device's radio frequency (RF) field does not exist.

Meanwhile, in the case where a device (device A, for example) communicates in near field with one other device (device B, for example), a plurality of independent devices (device a, device b, and device c, for example) may be housed inside the device A, and the device a, device b, and device c may be mutually coupled to each other in a wired configuration. In this case, the device A produces only one RF field. In other words, the device a, device b, and device c share a communication unit that communicates with other devices by an RF field, wherein only one among the device a, device b, and device c is able to conduct near field communication with the other device B as the device A.

Collisions occur when the respective device a, device b, and device c of the device A contemporaneously attempt to communicate with the device B. However, since the device a, device b, and device c do not independently produce RF fields, it may be difficult for a single device from among the device a, device b, and device c to detect in advance if the other remaining devices are producing an RF field as in the previous proposal.

Thus, technology configured to be able to reliably avoid collisions even in states where it is difficult to determine in advance if another device is producing an RF field has been disclosed (see Japanese Unexamined Patent Application Publication No. 2009-147845 and Japanese Unexamined Patent Application Publication No. 2007-34973, for example). Japanese Unexamined Patent Application Publication No. 2009-147845 proposes a method wherein, in the case where a plurality of devices (the device a, device b, and device c discussed above, for example) exist within a system (the device A discussed above, for example) that conducts contactless communication, a device fixed to the system (the device a discussed above, for example) is processed with priority. Japanese Unexamined Patent Application Publication No. 2007-34973 proposes a method of processing data between a system that conducts contactless communication (the device A discussed above, for example) and a single device within the system (the device a discussed above, for example).

SUMMARY

However, there has been a problem in that if a device fixed to the system is selected with priority when setting an order of priority for devices within a system, replying by contactless communication may not be suitably conducted, even if the device to be selected at the time of contactless communication is removable from the system.

In light of the above problems, it is desirable to provide a mobile terminal, an information processing method, and a computer program enabling suitable replying by contactless communication as a result of a suitable device being automatically selected in the case where a plurality of devices exist within a system that conducts contactless communication.

According to an embodiment of the present technology, there is provided a mobile terminal that includes a contactless communication unit configured to conduct contactless communication with an external communication apparatus, a plurality of memory units configured to store information to be transmitted to the communication apparatus, and a controller configured to control communication with the communication apparatus and set a priority order for the plurality of memory units when transmitting information from the plurality of memory units to the communication apparatus, wherein the controller sets the priority order depending on the current time.

The mobile terminal may also be configured to additionally include an image recognition unit configured to execute contactless communication-related image recognition processing when conducting such contactless communication with the communication apparatus, wherein the controller sets the priority order on the basis of results from image recognition processing by the image recognition unit.

The contactless communication-related image recognition processing executed by the image recognition unit may also be logo recognition processing.

The mobile terminal may also be configured to additionally include an audio recognition unit configured to execute audio recognition processing when conducting contactless communication with the communication apparatus, wherein the controller sets the priority order on the basis of results from audio recognition processing by the audio recognition unit.

It may also be configured such that the audio recognition unit recognizes a given sound produced by the communication apparatus when contactless communication with the communication apparatus was not performed normally, and the controller receives an indication that the audio recognition unit recognized the given sound and modifies the priority order.

It may also be configured such that, in the case where the same application is prepared in a plurality of memory units, the controller sets the priority order on the basis of results from referencing values stored in the plurality of memory units.

It may also be configured such that the controller sets the priority order on the basis of results from referencing balance information stored in the plurality of memory units, such that a memory unit with a higher balance is given a higher priority.

The mobile terminal may also be configured to include a radio communication unit configured to receive information from the communication apparatus via radio communication in advance when conducting contactless communication with the communication apparatus, wherein the controller sets the priority order on the basis of information received by the radio communication unit from the communication apparatus via radio communication.

The memory units may also be tamper-resistant.

According to another embodiment of the present technology, there is provided an information processing method that includes conducting contactless communication with an external communication apparatus, and controlling communication with the communication apparatus and setting a priority order for the plurality of memory units when transmitting information from a plurality of memory units to the communication apparatus, wherein the priority order is set depending on the time of day.

According to another embodiment of the present technology, there is provided a computer program causing a computer to conduct contactless communication with an external communication apparatus, and to control communication with the communication apparatus and set a priority order for a plurality of memory units when transmitting information from the plurality of memory units to the communication apparatus, wherein the priority order is set depending on the time of day.

As explained above, it is possible to provide a new and improved mobile terminal, information processing method, and computer program enabling suitable replying by contactless communication as a result of a suitable device being automatically selected in the case where a plurality of devices exist within a system that conducts contactless communication.

BRIEF DESCRIPTION OF THE DRAWINGS

FIG. 7B is an explanatory diagram illustrating a suitable secure element selection method by an RF chip incorporating near field contactless communication and RFID;

FIG. 8 is a flowchart explaining a suitable secure element selection method by an RF chip incorporating near field contactless communication and RFID;

FIG. 9A is an explanatory diagram illustrating a suitable secure element selection method by an RF chip based on current time information;

FIG. 9B is an explanatory diagram illustrating a suitable secure element selection method by an RF chip based on current time information;

FIG. 10 is an explanatory diagram illustrating a suitable secure element selection method by an RF chip incorporating image recognition functions;

FIG. 12B is an explanatory diagram illustrating a secure element selection method that detects an error sound produced by a reader-writer and modifies a secure element priority order;

DETAILED DESCRIPTION OF EMBODIMENTS

Figure 1:
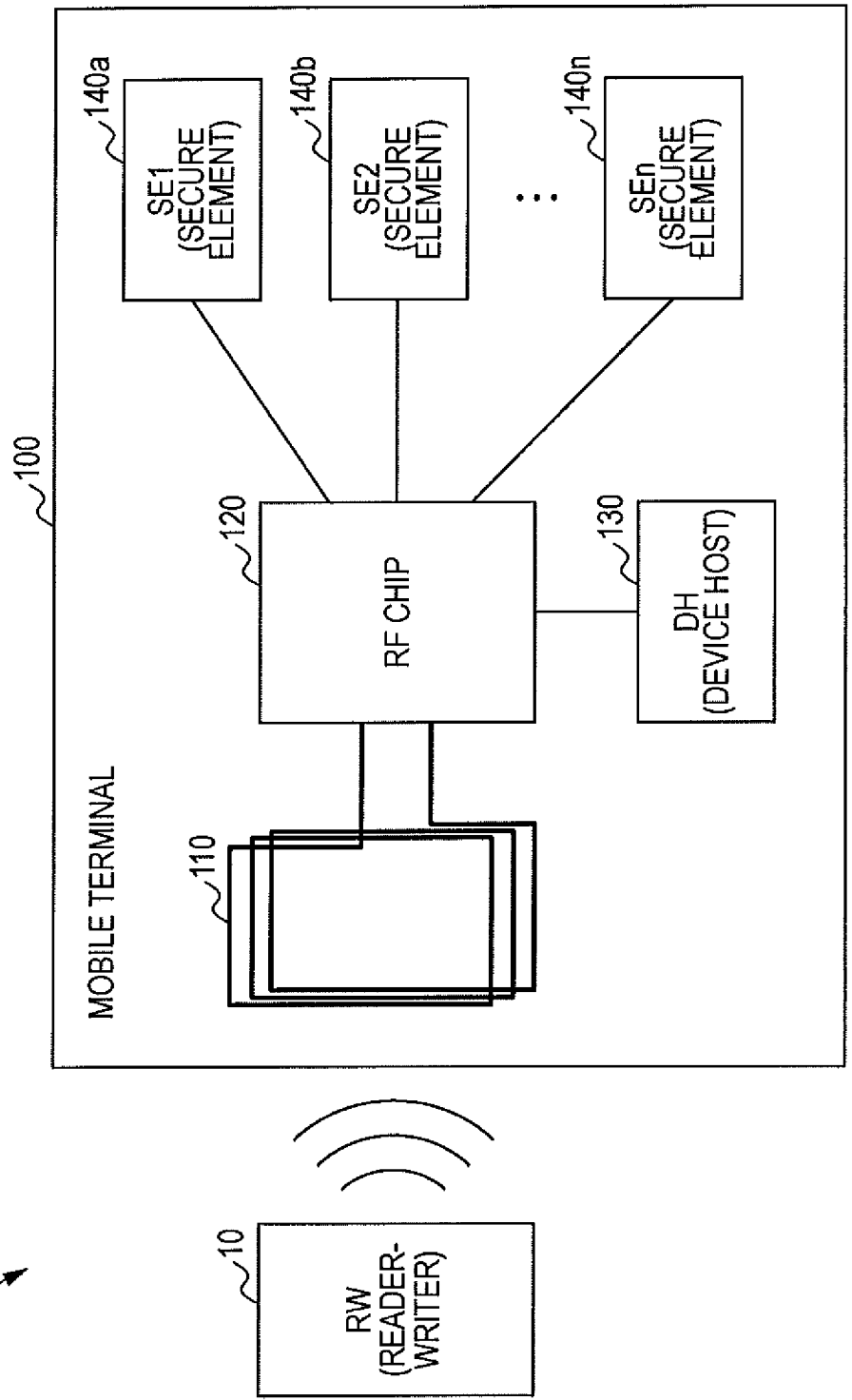
FIG. 1 is an explanatory diagram illustrating a configuration of a contactless communication system in accordance with an embodiment of the present technology.

A favorable embodiment of the present technology will be hereinafter explained in detail and with reference to the attached drawings. In the specification and drawings herein, duplicate explanation is omitted or reduced by assigning like reference numerals to elements having substantially similar functional configurations.

Explanation will proceed in the following order.
<1. Embodiment>
 [1-1. Contactless communication system configuration]
 [1-2. RF chip configuration]
 [1-3. Secure element configuration]
 [1-4. Mobile terminal operation]
  [1-4-1. Basic operation]
  [1-4-2. Incorporation of RFID]
  [1-4-3. Automatic selection by current time]
  [1-4-4. Incorporation of image recognition functions]
  [1-4-5. Incorporation of audio recognition functions]
  [1-4-6. Prioritization among identical applications]
<2. Conclusion>

1. EMBODIMENT

[1-1. Contactless Communication System Configuration]

First, a configuration of a contactless communication system in accordance with an embodiment of the present technology will be explained. FIG. 1 is an explanatory diagram illustrating a configuration of a contactless communication system 1 in accordance with an embodiment of the present technology. Hereinafter, FIG. 1 will be used to explain a configuration of a contactless communication system 1 in accordance with an embodiment of the present technology.

As illustrated in FIG. 1, a contactless communication system 1 in accordance with an embodiment of the present technology includes a reader-writer (RW) 10 and a mobile terminal 100. The reader-writer 10 and the mobile terminal 100 conduct near field communication according to the ISO 18092 communication scheme at a distance within several tens of centimeters (including cases of contact) and using a carrier wave at a frequency of 13.56 MHz in an industrial, scientific, and medical (ISM) band, for example.

Additionally, as illustrated in FIG. 1, the mobile terminal 100 includes an antenna coil 110, an RF chip 120, a device host (DV) 130, and secure elements (SEs) 140a to 140n.

The antenna coil 110 includes a closed loop coil, which receives signals wirelessly transmitted from the reader-writer 10 and also wirelessly transmits given signals to the reader-writer 10. More specifically, when an electromagnetic wave emitted from the reader-writer 10 pass through the antenna coil 110, electromagnetic induction is produced due to the electromagnetic wave, and current flows through the antenna coil 110. By detecting this current, the mobile terminal 100 is able to detect the content of a signal wirelessly transmitted from the reader-writer 10.

The RF chip 120 includes a 1-chip integrated circuit (IC), for example, which sends a signal that has been wirelessly transmitted from the reader-writer 10 and received by the antenna coil 110 to the device host 130 and the secure elements 140a to 140n. Additionally, the RF chip 120 receives information to be sent to the reader-writer 10 from the device host 130 and the secure elements 140a to 140n, and wirelessly transmits the information to the reader-writer 10 via the antenna coil 110 by running current in the antenna coil 110 to produce a magnetic field.

In other words, the RF chip 120 may for example use amplitude-shift keying (ASK) to demodulate a signal received by the antenna coil 110 (i.e., current flowing through the antenna coil 110), and send Manchester code of the demodulated data obtained as a result to the device host 130 and the secure elements 140a to 140n. In other words, the reader-writer 10 encodes data in Manchester code and transmits a signal made up of a carrier that has been ASK modulated according to the Manchester code. The RF chip 120 is able to obtain Manchester code by ASK demodulating a signal transmitted from the reader-writer 10.

The RF chip 120 also acquires Manchester code of data to be transmitted to the reader-writer 10 from the device host 130 and the secure elements 140a to 140n, and transmits data to the reader-writer 10 by conducting load modulation in accordance with the Manchester code, which varies the impedance of the antenna coil 110 in the mobile terminal 100 as seen by the reader-writer 10. Load modulation that varies the impedance of the antenna coil 110 as seen by the reader-writer 10 is a modulation of the unmodulated electromagnetic waves output by the reader-writer 10.

Herein, the RF chip 120 may also generate a data transfer clock on the basis of data transmitted from the reader-writer 10, and transmit the clock to the device host 130 and the secure elements 140a to 140n. It may also be configured such that the transmission of data among the RF chip 120, the device host 130, and the secure elements 140a to 140n is conducted in synchronization with this data transfer clock.

The device host 130 sends and receives data to and from the RF chip 120 and the secure elements 140a to 140n, and executes control with respect to the RF chip 120 and the secure elements 140a to 140n. Consequently, the device host 130 is provided with an interface for communicating with the RF chip 120, and an interface for communicating with the secure elements 140a to 140n. I2C, UART, ISO-7816, etc. may be used as interfaces provided in the device host 130, for example.

Additionally, the device host 130 internally stores a computer program for controlling the RF chip 120. The device host 130, by executing the computer program, becomes able to control operation of the RF chip 120. Similarly, the device host 130 may also internally store a computer program for controlling the secure elements secure elements 140a to 140n. The device host 130, by executing the computer program, becomes able to control operation of the secure elements 140a to 140n.

Herein, the device host 130 may also include secure element functions. By incorporating functionality as a secure element in the device host 130, the device host 130 can communicate with the RF chip 120 and the device host 130 can also be made to operate as a secure element.

The secure elements 140a to 140n are an example of respective memory units in the present technology, which send and receive data to and from the RF chip 120 and the device host 130, and securely conduct independent processing by operating according to respectively different applications. Consequently, it is desirable for the secure elements 140a to 140n to be tamper-resistant. Each application is assigned a system code which acts as identification information identifying respective applications. For example, the secure element 140a may function as a rail commuter pass and be assigned a system code SC0, the secure element 140b may function as a prepaid card used for purchasing at given participating stores and be assigned a system code SC1, and the secure element 140c may function as an identification (ID) card for the user's workplace and be assigned a system code SC2. For example, when the mobile terminal 100 is disposed near a reader-writer 10 operating according to an application of a given system code, the secure element from among the secure elements 140a to 140n that corresponds to the application with that system code communicates with the reader-writer 10.

Also, the secure elements 140a to 140n are respectively assigned identification numbers ID0, ID1, ID2, etc. that act as identification information identifying each secure element.

Although the administrator of each application knows the system code of the application he or she manages, the administrator does not the system codes of applications managed by other administrators. The secure elements 140a to 140n ascertain the presence of other secure elements for corresponding applications by specifying a system code, individually acquiring an ID for each ascertained secure element, and communicating with the individual secure elements on the basis of that ID.

With Japanese Unexamined Patent Application Publication No. 2009-147845, in the case where a plurality of secure elements are housed in a mobile terminal 100 in this way, a secure element fixed to the mobile terminal 100 is selected with priority. A secure element selection method according to a method disclosed in Japanese Unexamined Patent Application Publication No. 2009-147845 will now be briefly explained.

Figure 2:
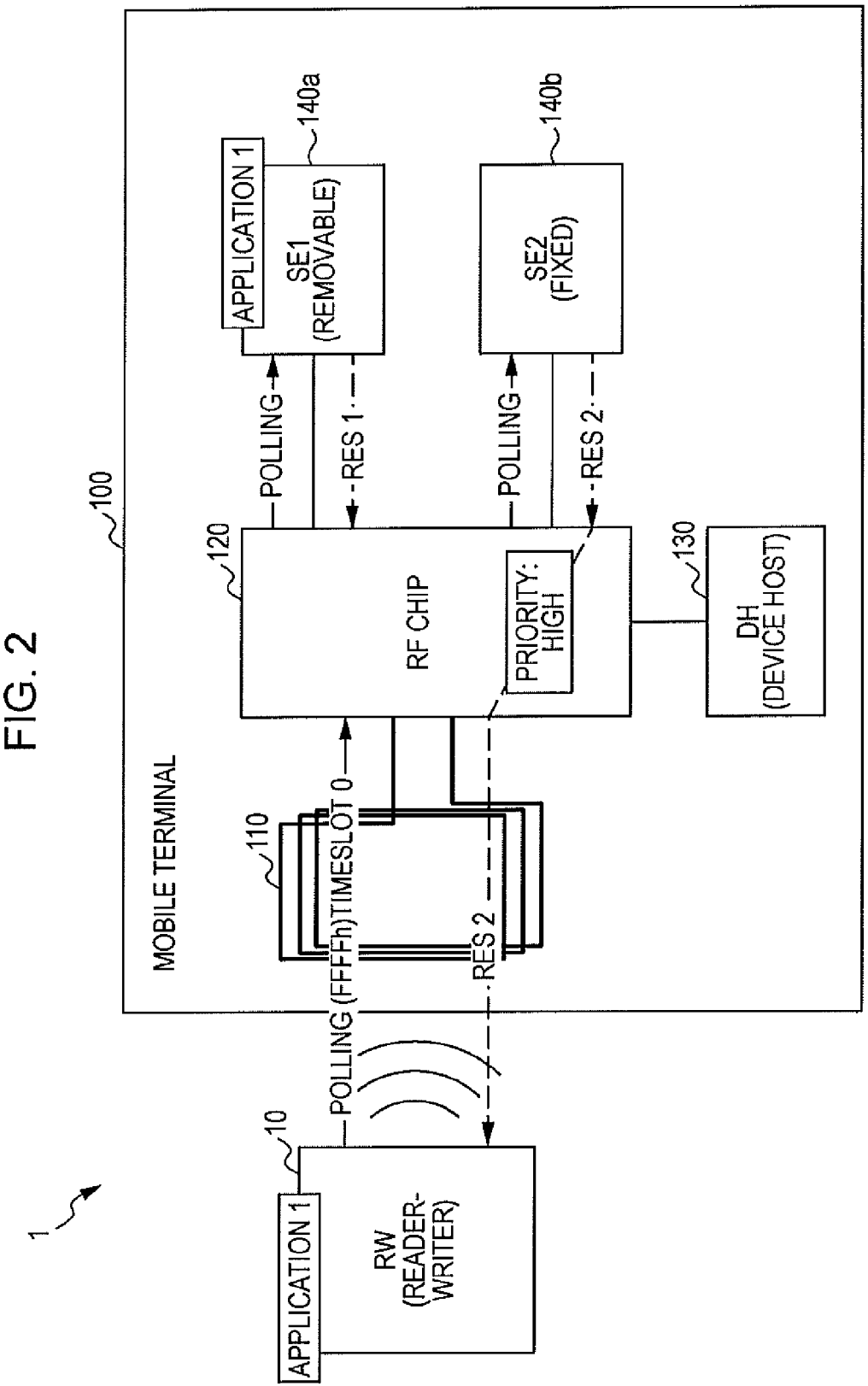
FIG. 2 is an explanatory diagram illustrating a case wherein a secure element selection method according to a method disclosed in Japanese Unexamined Patent Application Publication No. 2009-147845 is applied to the mobile terminal illustrated in FIG. 1.

FIG. 2 is an explanatory diagram illustrating a case wherein a secure element selection method according to a method disclosed in Japanese Unexamined Patent Application Publication No. 2009-147845 is applied to the mobile terminal 100 illustrated in FIG. 1. FIG. 2 illustrates a case where two secure elements 140a and 140b are housed in a mobile terminal 100. The secure element 140b is internally fixed to the mobile terminal 100 during the manufacturing of the mobile terminal 100, while the secure element 140a can be removably installed in the mobile terminal 100.

If a secure element selection method according to a method disclosed in Japanese Unexamined Patent Application Publication No. 2009-147845 is applied in such cases, the RF chip 120 prioritizes and selects the secure element 140b. However, applying the method produces undesired behavior in cases where the secure element that should be selected in the mobile terminal 100 upon receiving a signal from the reader-writer 10 is the secure element 140a that can be removably installed in the mobile terminal 100.

In other words, in the case where a given application (herein taken to be an Application 1) is provided in the reader-writer 10 and an application corresponding to this Application 1 is provided in the secure element 140a, if a secure element is selected according to a method disclosed in Japanese Unexamined Patent Application Publication No. 2009-147845, the secure element 140b which is not provided with the Application 1 is prioritized and selected. Consequently, since in this case the secure element 140b rather than the secure element 140a is selected upon receiving a signal from the reader-writer 10, a suitable reply may not be sent to the reader-writer 10.

Thus, the present embodiment describes a mobile terminal 100 wherein a secure element is automatically selected, and which enables replying by a suitable secure element even in the case where a plurality of secure elements are internally present.

The foregoing uses FIG. 1 to explain a configuration of a contactless communication system 1 in accordance with an embodiment of the present technology. Next, a configuration of an RF chip 120 included in a mobile terminal 100 in accordance with an embodiment of the present technology will be explained.

[1-2. RF Chip Configuration]

Figure 3:
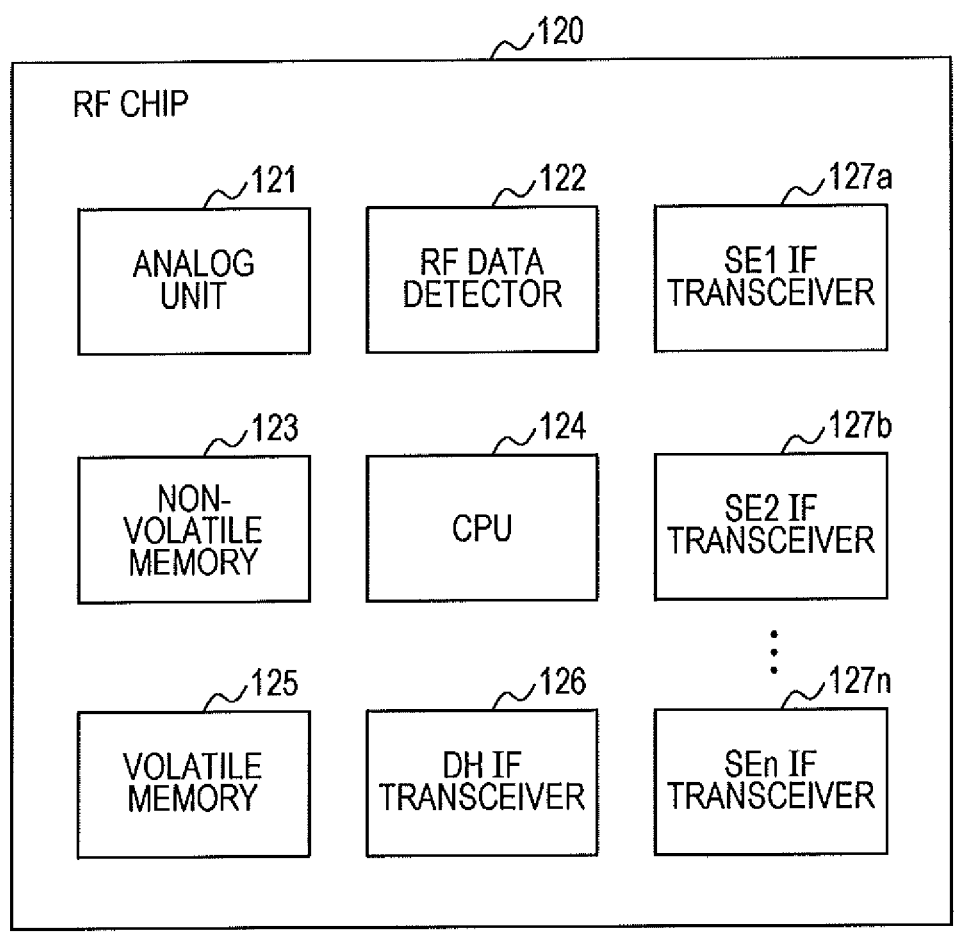
FIG. 3 is an explanatory diagram illustrating a configuration of an RF chip included in a mobile terminal in accordance with an embodiment of the present technology.

FIG. 3 is an explanatory diagram illustrating a configuration of an RF chip 120 included in a mobile terminal 100 in accordance with an embodiment of the present technology. Hereinafter, FIG. 3 will be used to explain a configuration of an RF chip 120 included in a mobile terminal 100 in accordance with an embodiment of the present technology.

As illustrated in FIG. 3, an RF chip 120 included in a mobile terminal 100 in accordance with an embodiment of the present technology includes an analog unit 121, an RF data detector 122, non-volatile memory 123, a CPU 124, volatile memory 125, a DH IF transceiver 126, and secure element (SE) IF transceivers 127a to 127n.

The analog unit 121 binarizes data received by the antenna coil 110. Upon binarizing data received by the antenna coil 110, the analog unit 121 passes the binarized data to the RF data detector 122.

The RF data detector 122 converts data that has been received by the antenna coil 110 and binarized by the analog unit 121 into digital data. Digital data that has been converted by the RF data detector 122 is sent to the CPU 124.

The non-volatile memory 123 is memory for storing various data, and since the memory is able to retain data even without a supply of power, its contents are retained even if the mobile terminal 100 is powered off. The non-volatile memory 123 stores information that should be retained even if the mobile terminal 100 is powered off, such as various settings data referenced by the CPU 124, for example. Various settings data referenced by the CPU 124 may include information on the priority order of the secure elements 140a to 140n, for example. By retaining information on the priority order of the secure elements 140a to 140n in the non-volatile memory 123, the CPU 124 is able to select a single secure element from among the secure elements 140a to 140n according to priority.

The CPU 124 controls operation of the RF chip 120. For example, the CPU 124 receives digital data obtained as a result of the RF data detector 122 converting data binarized by the analog unit 121, and processes that digital data. The CPU 124, by processing digital data passed from the RF data detector 122, exchanges various information with the device host 130 and the secure elements 140a to 140n.

Also, in the case where the CPU 124 receives information from the device host 130 and secure elements 140a to 140n and transmits that information to the reader-writer 10, the CPU 124 executes load modulation which varies the impedance of the antenna coil 110 as seen by the reader-writer 10.

Additionally, the CPU 124 sets the priorities of the secure elements 140a to 140n, and executes a process that stores the set priorities in the non-volatile memory 123. By setting the priorities of the secure elements 140a to 140n with the CPU 124, the secure element whose response should be used to reply to the reader-writer 10 can be determined when executing contactless communication with the reader-writer 10. Additionally, by suitably setting the priorities of the secure elements 140a to 140n with the CPU 124, it becomes possible to accomplish smooth contactless communication with the reader-writer 10.

The volatile memory 125 is memory for storing various data, and since the memory loses data when power is no longer supplied, the volatile memory 125 is memory whose contents are lost when the mobile terminal 100 is powered off. Primarily, data that should be retained temporarily is stored in the volatile memory 125.

The DH IF transceiver 126 is an interface that conducts communication between the RF chip 120 and the device host 130. Information transferred between the RF chip 120 and the device host 130 is exchanged between the RF chip 120 and the device host 130 via the DH IF transceiver 126.

The secure element IF transceivers 127a to 127n are interfaces that conduct communication between the RF chip 120 and the secure elements 140a to 140n. The RF chip 120 is provided with a number of secure element IF transceivers 127a to 127n equivalent to the number of secure elements housed in the mobile terminal 100.

The foregoing uses FIG. 3 to explain a configuration of an RF chip 120 included in a mobile terminal 100 in accordance with an embodiment of the present technology. Next, a configuration of a secure element housed in a mobile terminal 100 in accordance with an embodiment of the present technology will be explained.

[1-3. Secure Element Configuration]

Figure 4:
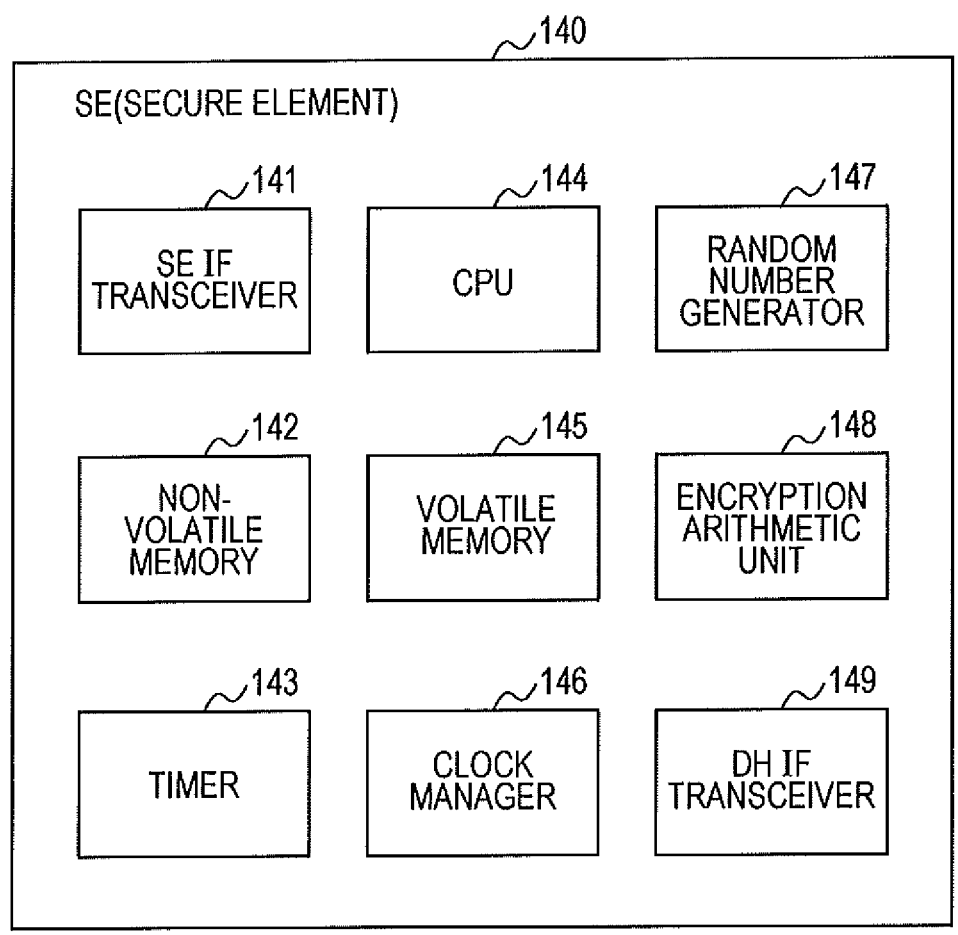
FIG. 4 is an explanatory diagram illustrating a configuration of a secure element included in a mobile terminal in accordance with an embodiment of the present technology.

FIG. 4 is an explanatory diagram illustrating a configuration of secure elements 140a to 140n (herein collectively referred to as a secure element 140) housed in a mobile terminal 100 in accordance with an embodiment of the present technology. Hereinafter, FIG. 4 will be used to explain a configuration of a secure element 140 housed in a mobile terminal 100 in accordance with an embodiment of the present technology.

As illustrated in FIG. 4, a secure element 140 includes a secure element (SE) IF transceiver 141, non-volatile memory 142, a timer 143, a CPU 144, volatile memory 145, a clock manager 146, a random number generator 147, an encryption arithmetic unit 148, and a DH IF transceiver 149.

The secure element IF transceiver 141 is an interface that conducts communication between the RF chip 120 and the secure element 140, and is the part that conducts transmitting and receiving control of an I2C, UART, SWP, or other interface coupled to the RF chip 120. Data transfer between the RF chip 120 and the secure element 140 is conducted via the secure element IF transceiver 141. Data received from the RF chip 120 by the secure element IF transceiver 141 is sent to the CPU 144, and data processing is conducted in the CPU 144.

The non-volatile memory 142 is memory for storing various data, and since the memory is able to retain data even without a supply of power, its contents are retained even if the mobile terminal 100 is powered off. The non-volatile memory 142 stores information that should be retained even if the mobile terminal 100 is powered off. For example, if the secure element 140 includes electronic money functions, then information such as balance information and point information may be stored. If the secure element 140 includes rail or other commuter pass functions, then information such as the pass period and expiration date may be stored.

The timer 143 counts processing timeouts or other timings. The timer 143 executes count operations by receiving a supplied clock generated by the clock manager 146.

The CPU 144 controls operation of the secure element 140. More specifically, the CPU 144 receives data from the secure element IF transceiver 141 that has been received by the secure element IF transceiver 141 from the RF chip 120, and executes various processing according to the received data.

The volatile memory 145 is memory for storing various data, and since the memory loses data when power is no longer supplied, the volatile memory 145 is memory whose contents are lost when the mobile terminal 100 is powered off. Primarily, data that should be retained temporarily is stored in the volatile memory 145.

The clock manager 146 generates a clock utilized by internal operations of the secure element 140. Consequently, the clock manager 146 is provided with a given clock generator. The respective units of the secure element 140 illustrated in FIG. 4 operate on the basis of a clock generated by the clock manager 146. For example, as discussed earlier, the timer 143 executes count operations by receiving a supplied clock generated by the clock manager 146, executing given clock processing and timeout processing.

The random number generator 147 generates random numbers (true random numbers) to be used for communication with the reader-writer 10. The encryption arithmetic unit 148 encrypts data and decrypts encrypted data.

The DH IF transceiver 149 is used when direct communication between the device host 130 and the secure element 140 is executed without communicating via the RF chip 120. The DH IF transceiver 149 may for example use ISO-7816, UART, etc. However, the DH IF transceiver 149 may also be omitted from the secure element 140, and depending on the system, may not be incorporated into the secure element 140 in some cases.

Additionally, the secure element 140 illustrated in FIG. 4 is tamper-resistant in order to protect data stored in the non-volatile memory 142. By imparting tamper-resistance to the secure element 140, reading the data stored in the non-volatile memory 142 can be prevented.

The foregoing uses FIG. 4 to explain a configuration of a secure element 140 housed in a mobile terminal 100 in accordance with an embodiment of the present technology. Next, operation of a mobile terminal 100 in accordance with an embodiment of the present technology will be explained.

[1-4. Mobile Terminal Operation]
[1-4-1. Basic Operation]

Figure 5:
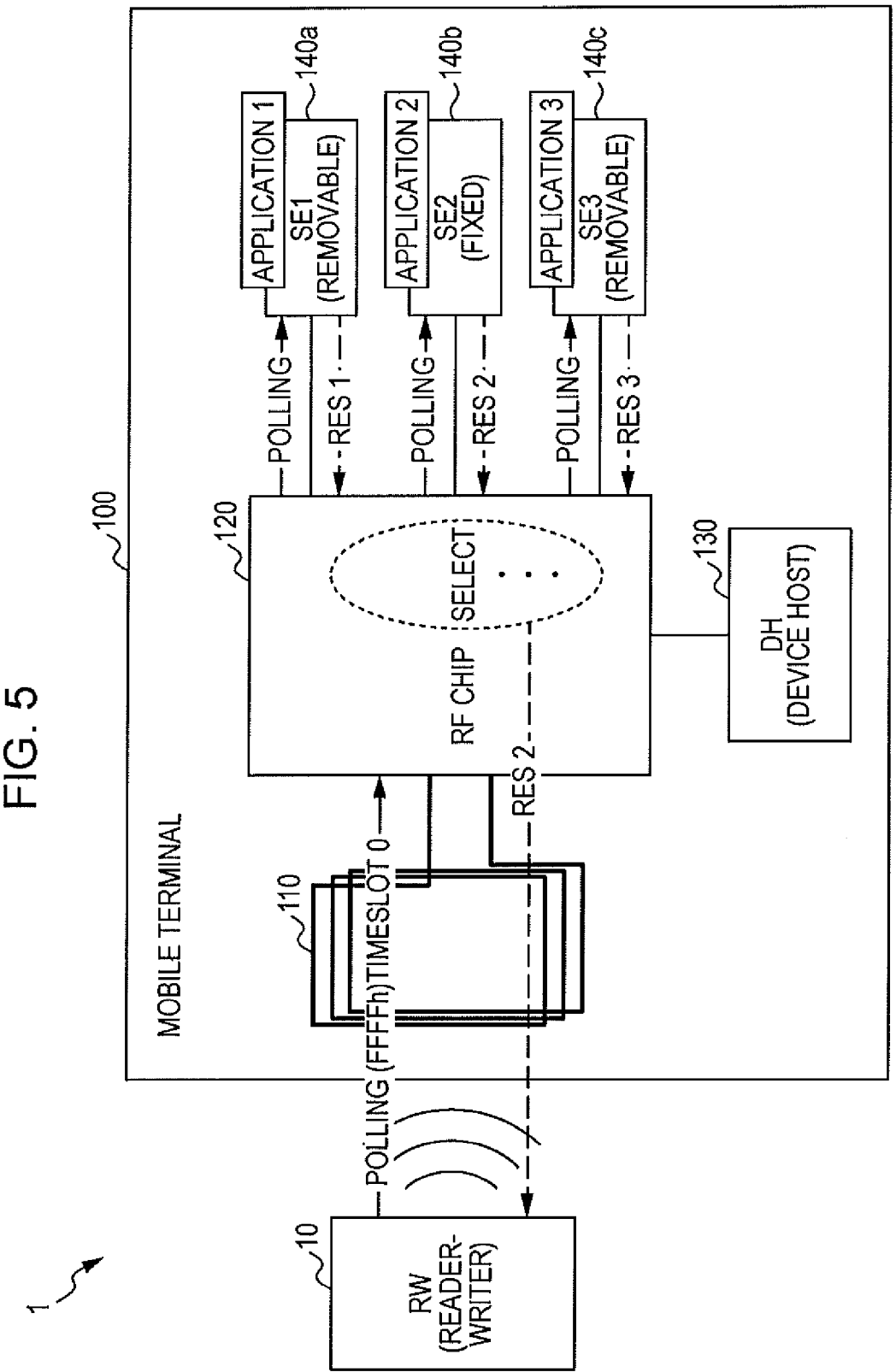
FIG. 5 is an explanatory diagram explaining basic operation of a mobile terminal in accordance with an embodiment of the present technology.

FIG. 5 is an explanatory diagram explaining basic operation of a mobile terminal 100 in accordance with an embodiment of the present technology. Hereinafter, FIG. 5 will be used to explain operation of a mobile terminal 100 in accordance with an embodiment of the present technology.

FIG. 5 illustrates a contactless communication system 1 wherein a plurality of secure elements 140*a*, 140*b*, and 140*c* are housed in a mobile terminal 100, with respective applications present in each secure element. The secure element 140*b* is taken to be a secure element that is fixed to the mobile terminal 100, while the secure elements 140*a* and 140*c* are taken to be secure elements that are removable from the mobile terminal 100.

In such a contactless communication system 1, in the case where a polling command for a given system code ("0xFFFF", for example) with a timeslot of 0 is received from the reader-writer 10, the RF chip 120 selects one of the polling responses returned by the secure elements 140*a*, 140*b*, and 140*c* and replies to the reader-writer 10.

As discussed earlier herein, with the technology disclosed in Japanese Unexamined Patent Application Publication No. 2009-147845, when the RF chip 120 selects one of the polling response returned by the secure elements 140*a*, 140*b*, and 140*c* and replies to the reader-writer 10, the response from the secure element 140*b* fixed to the mobile terminal 100 is selected with priority.

However, in the case where the application of the reader-writer 10 that transmitted the polling command and the application of the secure element 140*b* fixed to the mobile terminal 100 do not match, the reader-writer 10 and the mobile terminal 100 may become unable to communicate. In the example illustrated in FIG. 5, an "Application 1" is readied in the reader-writer 10, for example, and as illustrated in FIG. 5, an "Application 1" is readied in the secure element 140*a*, an "Application 2" is readied in the secure element 140*b*, and an "Application 3" is readied in the secure element 140*c*. In this case, the secure element 140*a* is the secure element that should reply to the reader-writer 10, but if a response from the secure element 140*b* fixed to the mobile terminal 100 is selected with priority, the reader-writer 10 and the mobile terminal 100 may be unable to communicate because the application of the reader-writer 10 and the application of the secure element 140*b* differ.

Thus, in the present embodiment, information on applications included in secure elements and unique information identifying secure elements (IDm) is internally stored in the RF chip 120 in advance (in the non-volatile memory 123, for example). The RF chip 120 then uses internally stored information to select a suitable secure element and reply to the reader-writer 10.

Herein, the timing at which information on applications included in secure elements and unique information identifying secure elements (IDm) is internally stored in the RF chip 120 may be the time when the mobile terminal 100 is powered on or the time when the removable secure elements 140*a* and 140*c* are installed in or removed from the mobile terminal 100, for example. Otherwise, the timing may be when the user of the mobile terminal 100 issues instructions to store secure element application information in the RF chip 120.

Figure 6:
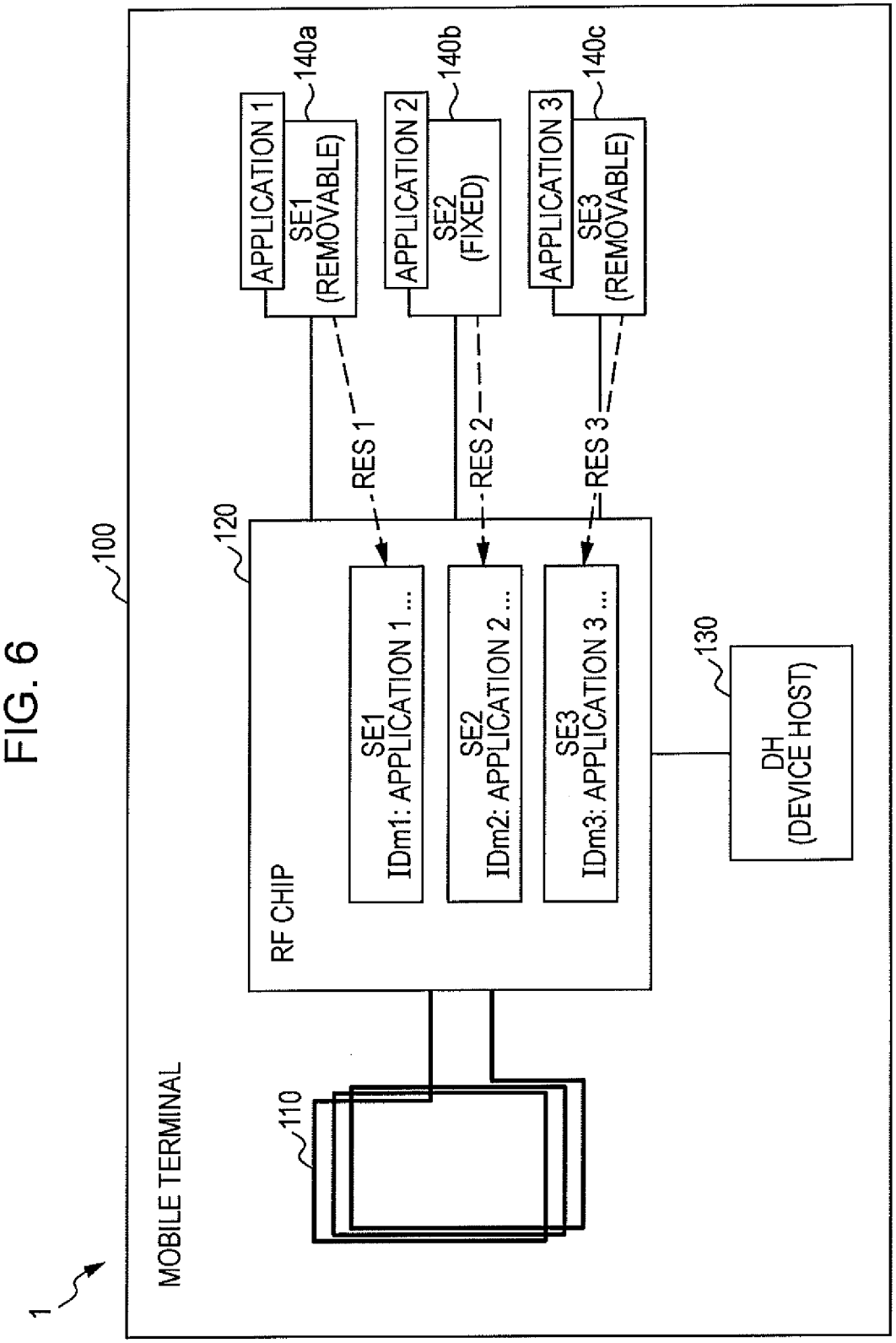
FIG. 6 is an explanatory diagram illustrating how information on applications included in a secure element and unique information identifying a secure element is internally stored in an RF chip.

FIG. 6 is an explanatory diagram illustrating how information on applications included in secure elements and unique information identifying secure elements is internally stored in an RF chip 120. As illustrated in FIG. 6, in the present embodiment, information on applications included in secure elements 140*a*, 140*b*, and 140*c* and unique information identifying the secure elements 140*a*, 140*b*, and 140*c* is stored in the RF chip 120. The RF chip 120 then references this information to select a suitable secure element and reply to a reader-writer 10 that has transmitted a polling command. As a result, a mobile terminal 100 in accordance with the present embodiment is able to execute suitable communication with a reader-writer 10.

Hereinafter, a suitable secure element selection method in an RF chip 120 will be explained in detail by giving several examples.

[1-4-2. Incorporation of RFID]

Figure 7A:
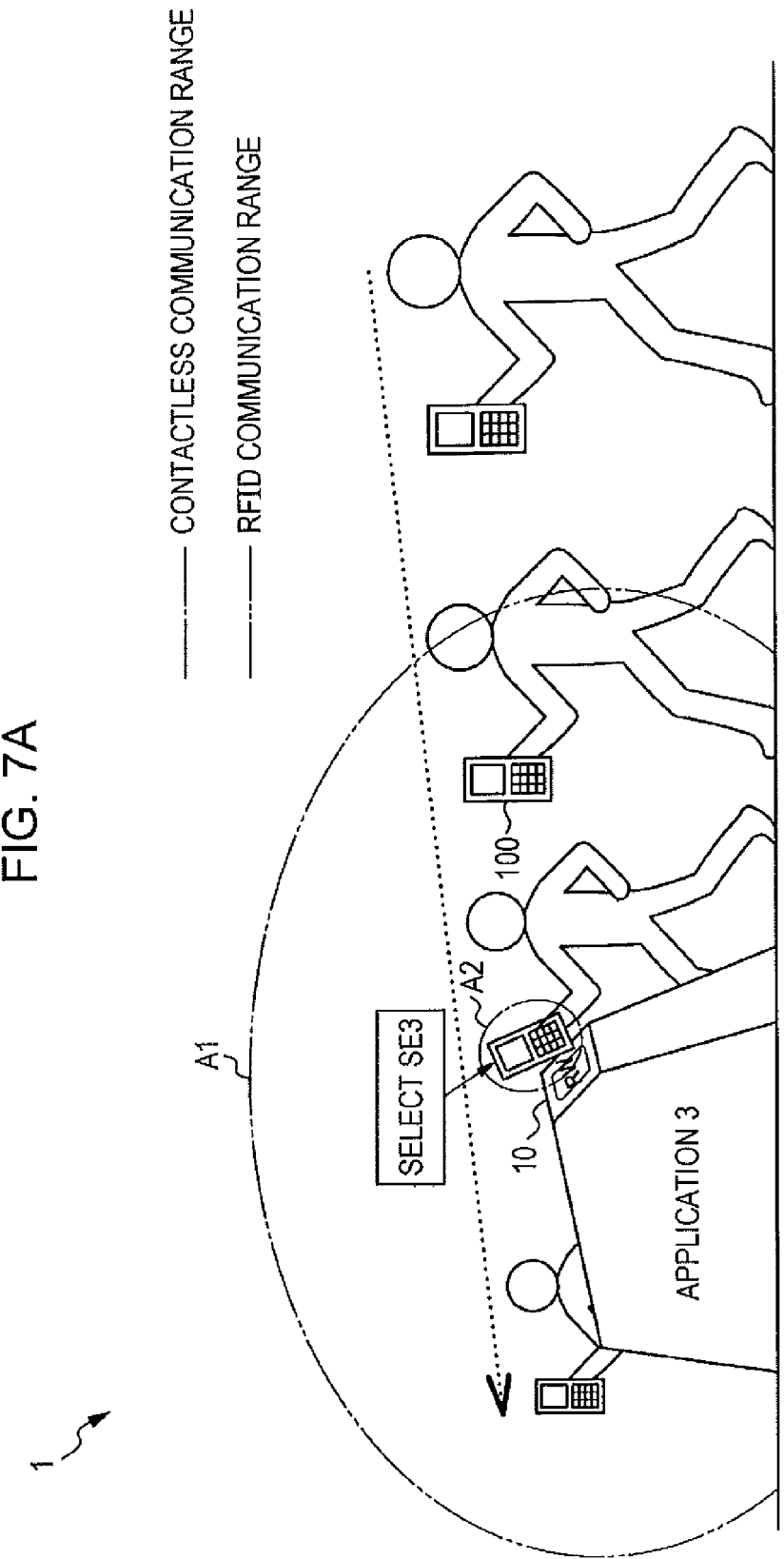
FIG. 7A is an explanatory diagram illustrating a suitable secure element selection method by an RF chip incorporating near field contactless communication and RFID.

First, a suitable secure element selection method by an RF chip 120 incorporating near field contactless communication and radio-frequency identification (RFID) will be explained. FIGS. 7A and 7B are explanatory diagrams illustrating a suitable secure element selection method by an RF chip 120 incorporating near field contactless communication and RFID.

FIG. 7A illustrates a case where the user of a mobile terminal 100 passes through the turnstile of a train station by waving the mobile terminal 100 over a reader-writer installed in the turnstile. Additionally, FIG. 7A illustrates a case where the reader-writer 10 is provided with short-range radio communication functions using RFID communicable from five to several tens of meters, which is a wider communication range than near field contactless communication from approximately several centimeters to over ten centimeters with the mobile terminal 100. The sign A1 in FIG. 7A represents the range over which short-range radio communication using RFID is possible, while the sign A2 represents the range over which near field contactless communication is possible. Obviously, the extents of the respective ranges are not limited to the example illustrated in FIG. 7A.

First, short-range radio communication functions are used to report in advance information related to an application for which communication is desired from the reader-writer 10 to the mobile terminal 100. The mobile terminal 100 transmits the reported application information to the RF chip 120. In the example illustrated in FIGS. 7A and 7B, the reader-writer 10 has an "Application 3", and information related to this "Application 3" is sent out by short-range radio communication functions. The mobile terminal 100, having received radio waves sent out from the reader-writer 10, determines priorities in the RF chip 120 such that the secure element 140c having "Application 3" is selected with priority.

For determining priorities in the RF chip 120, it may also be configured such that, for example, the mobile terminal 100 is provided with a radio receiver for receiving radio waves emitted by short-range radio communication functions that differ from the antenna coil 110, wherein radio waves emitted from the reader-writer 10 are received with the radio receiver and the information transmitted from the reader-writer 10 is acquired by the device host 130. The device host 130 may then report the information transmitted from the reader-writer 10 to the RF chip 120. In so doing, the RF chip 120 is able to select a secure element having the application reported by the reader-writer 10 with priority before waving the mobile terminal 100 over the reader-writer 10.

FIG. 8 is a flowchart explaining a suitable secure element selection method by an RF chip 120 incorporating near field contactless communication and RFID. Hereinafter, a suitable secure element selection method by an RF chip 120 incorporating near field contactless communication and RFID will be explained in detail.

If a mobile terminal 100 enters RFID communication range while in a state where radio waves are being emitted from a reader-writer 10 by short-range radio communication functions, the device host 130 first detects a radio wave from the reader-writer 10 (step S101), receives a radio wave from the reader-writer 10, detects information transmitted from the reader-writer 10 by short-range radio communication, and reports detected application information from the device host 130 to the RF chip 120 (step S102). Herein, the reader-writer is taken to be provided with an "Application 3", and information related to this "Application 3" is taken to be transmitted from the reader-writer 10 by short-range radio communication. However, the specific information reported from the device host 130 to the RF chip 120 may be any information able to specify an application such as a system code.

The RF chip 120 receives application information that has been transmitted from the reader-writer 10 by short-range radio communication from the device host 130, and sets "Application 3" to priority order #1 on the basis of this information (step S103). In so doing, it becomes possible for the RF chip 120 to prioritize a response from the secure element 140c and reply to the reader-writer 10.

Subsequently, if the user of the mobile terminal 100 approaches the reader-writer 10 and waves the mobile terminal 100 over the reader-writer 10, the mobile terminal 100 detects a 13.56 MHz magnetic field emitted from the reader-writer 10 (step S104). After that, a polling command for a given system code ("0xFFFF", for example) with a timeslot of 0 is emitted from the reader-writer 10 (step S105), and the RF chip 120 of the mobile terminal 100 receives the polling command transmitted from the reader-writer 10 (step S106).

If the RF chip 120 receives a polling command from the reader-writer 10 in the above step S106, the RF chip 120 forwards the received polling command to each of the secure elements 140a, 140b, and 140c (steps S107, S108, and S109). The secure elements 140a, 140b, and 140c, having received the polling command forwarded from the RF chip 120, reply to the RF chip 120 with a response for the polling command (steps S110, S111, and S112).

The RF chip 120, having received the responses of the secure elements 140a, 140b, and 140c to the polling command, replies to the reader-writer 10 with the response from the secure element 140c having the "Application 3", since the "Application 3" was set to priority order #1 in the above step S103 (step S113). At this point, the RF chip 120 adjusts the timeslot timing and replies to the reader-writer 10 with the response from the secure element 140c.

If the response from the secure element 140c is selected in the RF chip 120 in the above step S113, the RF chip 120 replies to the reader-writer 10 with the response from the secure element 140c via the antenna coil 110 (step S114).

In this way, information on an application to be selected is received in advance by using short-range radio communication functions having a broader communication range than near field contactless communication by a magnetic field of given frequency (13.56 MHz, for example), and an application priority order is set on the basis of this information. In so doing, it becomes possible for a mobile terminal 100 in accordance with the present embodiment to communicate by selecting a suitable application during near field contactless communication with a reader-writer 10.

The foregoing uses FIG. 8 to explain a suitable secure element selection method by an RF chip 120 incorporating near field contactless communication and RFID. In the example discussed above, RFID is given as an example of short-range radio communication functions having a wider communication range than near field contactless communication by a magnetic field of given frequency (13.56 MHz, for example), but the short-range radio communication functions are not limited to such an example. For example, wireless communication using radio waves in the 2.4 GHz band compliant with IEEE 802.15.1 may also be used as the short-range radio communication functions.

[1-4-3. Automatic Selection by Current Time]

Next, a suitable secure element selection method by an RF chip 120 based on current time information will be explained. FIGS. 9A and 9B are explanatory diagrams illustrating a suitable secure element selection method by an RF chip 120 based on current time information.

FIG. 9A illustrates how a selected application changes depending on the time of day. There are cases where the user of the mobile terminal 100 may use different application depending on the time of day. For example, in some cases a user may use an entry permit application when going to work in the morning, an application having electronic money functions in the afternoon, and an application having rail commuter pass functions in the evening.

In such cases, current time information counted by the device host 130 is reported to the RF chip 120 on demand, as illustrated in FIG. 9B. The RF chip 120, on the basis of current time information reported by the device host 130, sets the application priority order depending on the time of day. For example, the RF chip 120 may set "Application 3" to priority order #1 in the morning, "Application 1" to priority order #1 in the afternoon, and "Application 3" to priority order #1 in the evening.

Herein, the timing at which the current time is reported from the device host 130 to the RF chip 120 may be configurable by the user of the mobile terminal 100, or may be a preset timing. Also, it may be configured such that time information is processed at the device host 130 and only priority order settings are conducted by the RF chip 120.

As a result of the RF chip 120 establishing a suitable priority order on the basis of current time information in this way, a mobile terminal 100 in accordance with the present embodiment becomes able to select a suitable application and reply during near field contactless communication with a reader-writer 10.

[1-4-4. Incorporation of Image Recognition Functions]

Next, a suitable secure element selection method by an RF chip 120 incorporating image recognition functions will be explained. FIG. 10 is an explanatory diagram illustrating a suitable secure element selection method by an RF chip 120 incorporating image recognition functions.

For example, in the case where a digital still camera or other imaging device able to identify images (not illustrated) is built into the mobile terminal 100, an application logo, etc. depicted on a reader-writer 10 can be imaged by an imaging device while (or before) the mobile terminal 100 is waved over the reader-writer 10. FIG. 10 illustrates a state wherein an application logo that has been imaged by the imaging device is being displayed on a display unit 150 of a mobile terminal 100.

The logo is then imaged by the imaging device, and the RF chip 120 executes application priority ordering on the basis of an image detected by the device host 130. In the example illustrated in FIG. 10, a logo depicted on a reader-writer 10 (or depicted in the vicinity of a reader-writer 10) provided on a vending machine is imaged by a mobile terminal 100, and image recognition processing is executed in the device host 130. The image recognition processing in the device host 130 may involve, for example, comparing an image imaged by an imaging device to a pattern prepared in advance and determining how much the two resemble each other by pattern matching. The RF chip 120 then raises the priority order of the secure element 140a installed with Application 1 on the basis of information reported from the device host 130. The mobile terminal 100, having received a polling command from the reader-writer 10, replies to the reader-writer 10 with a response from the secure element 140a on the basis of the set priority order.

As a result of the RF chip 120 establishing a suitable priority order on the basis of image recognition information in this way, a mobile terminal 100 in accordance with the present embodiment becomes able to select a suitable application and reply during near field contactless communication with a reader-writer 10.

In the example discussed above, a secure element priority order is established in an RF chip 120 by imaging a logo depicted on a reader-writer 10 (or depicted in the vicinity of a reader-writer 10) with an imaging unit provided in a mobile terminal 100, executing image recognition processing on the logo in the device host 130, and reporting the image recognition processing results to the RF chip 120. However, the present technology is not limited to such an example. For example, a secure element priority order may also be established in an RF chip 120 by imaging a two-dimensional barcode depicted on a reader-writer 10 (or depicted in the vicinity of a reader-writer 10), recognizing information stated in the two-dimensional barcode with the device host 130, and reporting the recognition processing results to the RF chip 120.

As another example, it may also be configured such that the color or shape of a mark is recognized rather than a logo, and a secure element priority order is established in the RF chip 120 according to the recognition results. By executing simpler processing than the image recognition processing for a logo, it is possible to shorten the time from imaging until a secure element priority order is established.

As another example, it may also be configured such that a secure element priority order is established in the RF chip 120 by detecting with the device host 130 the characteristic shape of an object imaged by an imaging unit provided in the mobile terminal 100. For example, by imaging a coin slot, product selection button, product price information, etc. on a vending machine, the device host 130 can be made to recognize that the mobile terminal 100 is about to be waved over a reader-writer 10 provided on the vending machine and transaction processing is to be conducted. Then, the device host 130 having recognized the above may instruct the RF chip 120 to increase the priority order of a secure element in which an application having electronic money functions is prepared. Having received the instructions, the RF chip 120 may set a higher priority order for such a secure element.

[1-4-5. Incorporation of Audio Recognition Functions]

Figure 11:
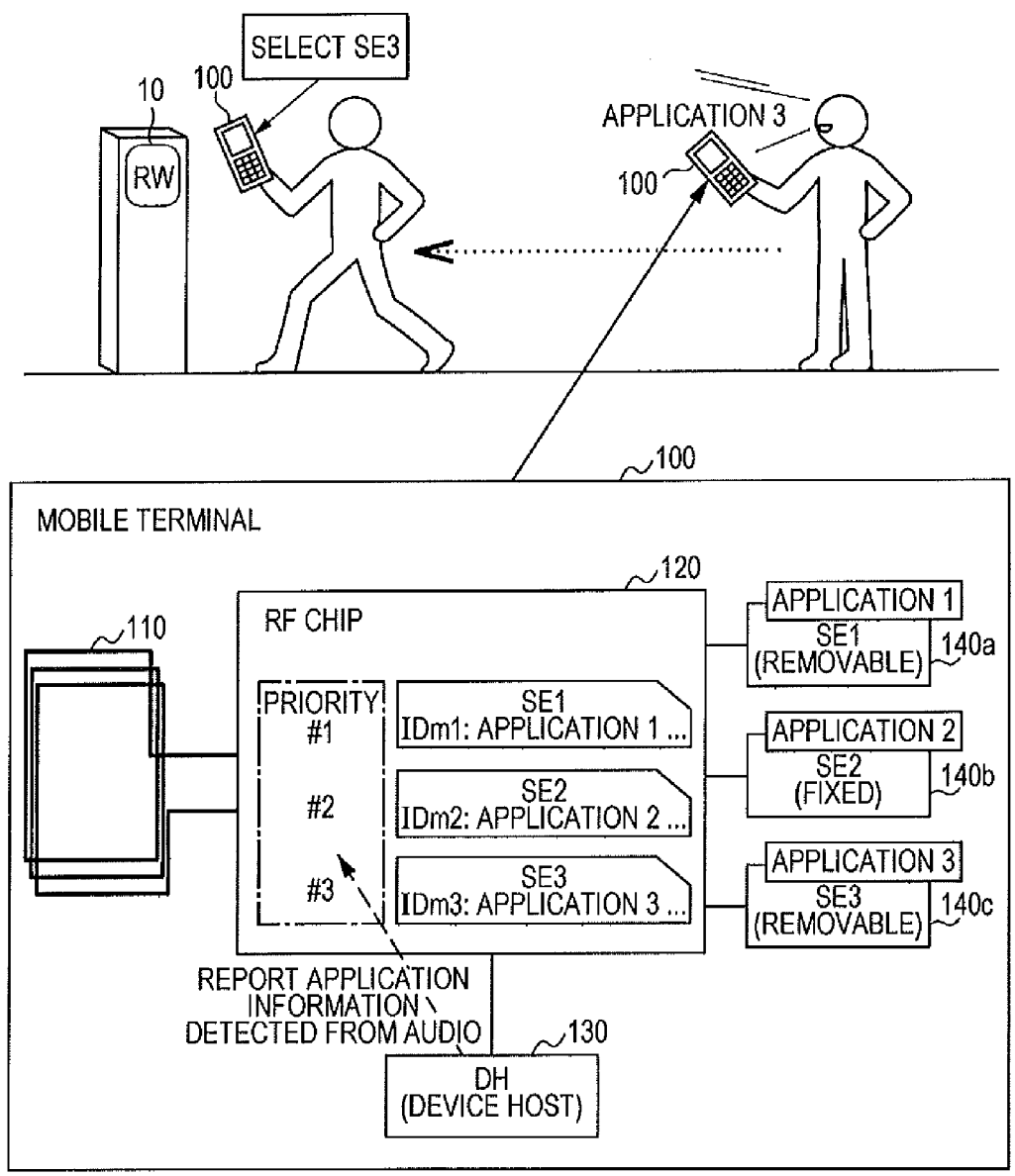
FIG. 11 is an explanatory diagram illustrating a suitable secure element selection method by an RF chip incorporating audio recognition functions.

Next, a suitable secure element selection method by an RF chip 120 incorporating audio recognition functions will be explained. FIG. 11 is an explanatory diagram illustrating a suitable secure element selection method by an RF chip 120 incorporating audio recognition functions.

For example, in the case where a microphone or other sound pickup device (not illustrated) is built into the mobile terminal 100, the user of the mobile terminal 100 may report information on the application he or she wants to use by voice before waving the mobile terminal 100 over a reader-writer 10. The content that is reported may be the name of the application the user wants to use, an application number, or any other content able to identify an application included in the mobile terminal 100.

The user's voice is then picked up by the sound pickup device and the RF chip 120 establishes an application priority order on the basis of the content detected by the device host 130. In the example illustrated in FIG. 11, the user of the mobile terminal 100 reports to the mobile terminal 100 in advance by voice, indicating that an "Application 3" is to be used. The device host 130 instructs the RF chip 120 to establish a priority order on the basis of the voiced report by the user of the mobile terminal 100. The RF chip 120 sets the secure element 140c having the "Application 3" to priority order #1.

After that, if the mobile terminal 100 is waved over a reader-writer 10 and a polling command is received from the reader-writer 10, then the RF chip 120 selects the response from the secure element 140c and issues a reply to the reader-writer 10. In this way, by selecting and replying with a response from a secure element having a suitable application, a mobile terminal 100 in accordance with the present embodiment becomes able to select a suitable application and communicate during near field contactless communication with a reader-writer 10.

As a modification of a suitable secure element selection method by an RF chip 120 incorporating audio recognition functions, it may be configured such that an error sound produced by a reader-writer 10 is detected and the secure element priority order is modified. Hereinafter, a secure element selection method that detects an error sound produced by a reader-writer 10 and modifies a secure element priority order will be explained.

Figure 12A:
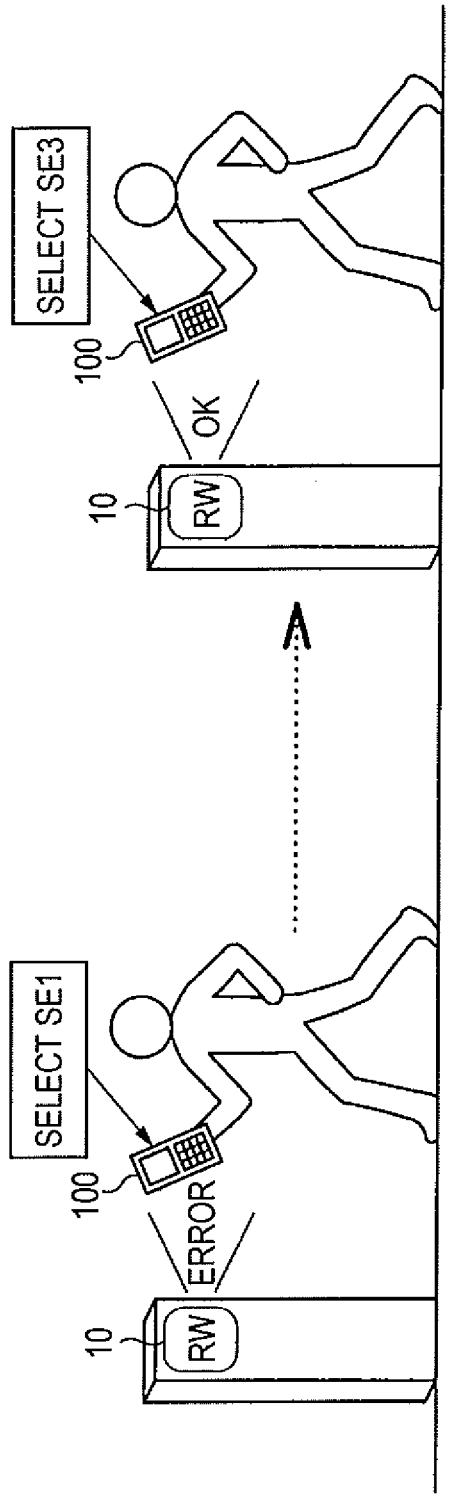
FIG. 12A is an explanatory diagram illustrating a secure element selection method that detects an error sound produced by a reader-writer and modifies a secure element priority order.

FIGS. 12A and 12B are explanatory diagrams illustrating a secure element selection method that detects an error sound produced by a reader-writer 10 and modifies a secure element priority order.

In the example illustrated in FIGS. 12A and 12B, the case where two secure elements 140a and 140b are housed in a mobile terminal 100 is illustrated. Herein, the secure element 140a is a secure element that is fixed to the mobile terminal 100, while the secure element 140b is a secure element that is removable from the mobile terminal 100. Additionally, the same application, an "Application 4", is taken to be respectively recorded in the secure elements 140a and 140b. Furthermore, this "Application 4" is taken to be an application having electronic money functions.

Additionally, in the mobile terminal 100, the secure element 140a is taken to be set to priority order #1 in advance in the RF chip 120.

Given this state, consider the case where the user of the mobile terminal 100 completes a product purchase using the "Application 4" prepared in the mobile terminal 100. Although the secure element 140a is set to priority order #1 in the RF chip 120, a balance of 0 yen is recorded in the "Application 4" of the secure element 140a. Consequently, if the user of the mobile terminal 100 tries to complete a product purchase by just waving the mobile terminal 100 over a reader-writer 10, the transaction may not be completed due to insufficient funds.

Thus, the mobile terminal 100 detects a specific error sound produced by the reader-writer 10 when a mobile terminal 100 with insufficient funds is waved over it, and the RF chip 120 modifies the secure element priority order on the basis of the detected error sound. In the example illustrated in FIG. 12, the error sound is picked up by the mobile terminal 100, and the occurrence of the error sound is detected by the device host 130. The device host 130, having detected the occurrence of the error sound, instructs the RF chip 120 to modify the priority order. The RF chip 120, having received instructions from the device host 130, modifies the secure element priority order on the basis of the instructions. More specifically, the RF chip 120 sets the priority order of the secure element 140b to #1. In so doing, the secure element priority order is automatically modified by an internal RF chip 120 in a mobile terminal 100 and a product purchase can be completed without the user of the mobile terminal 100 performing special operations.

Figure 13A:
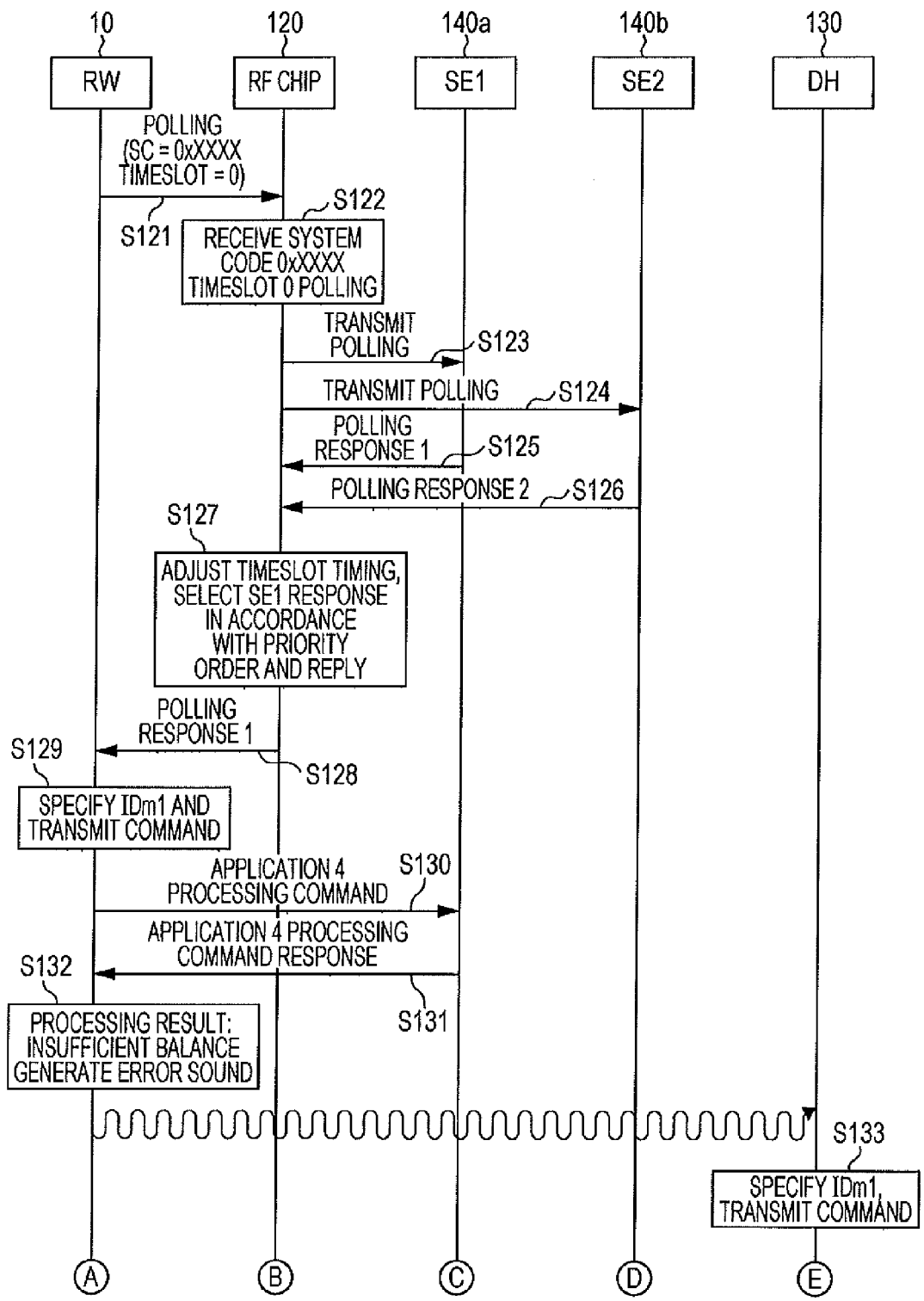
FIG. 13A is a flowchart explaining a suitable secure element selection method by an RF chip based on error sound detection in the mobile terminal illustrated in FIGS. 12A and 12B.
Figure 13B:
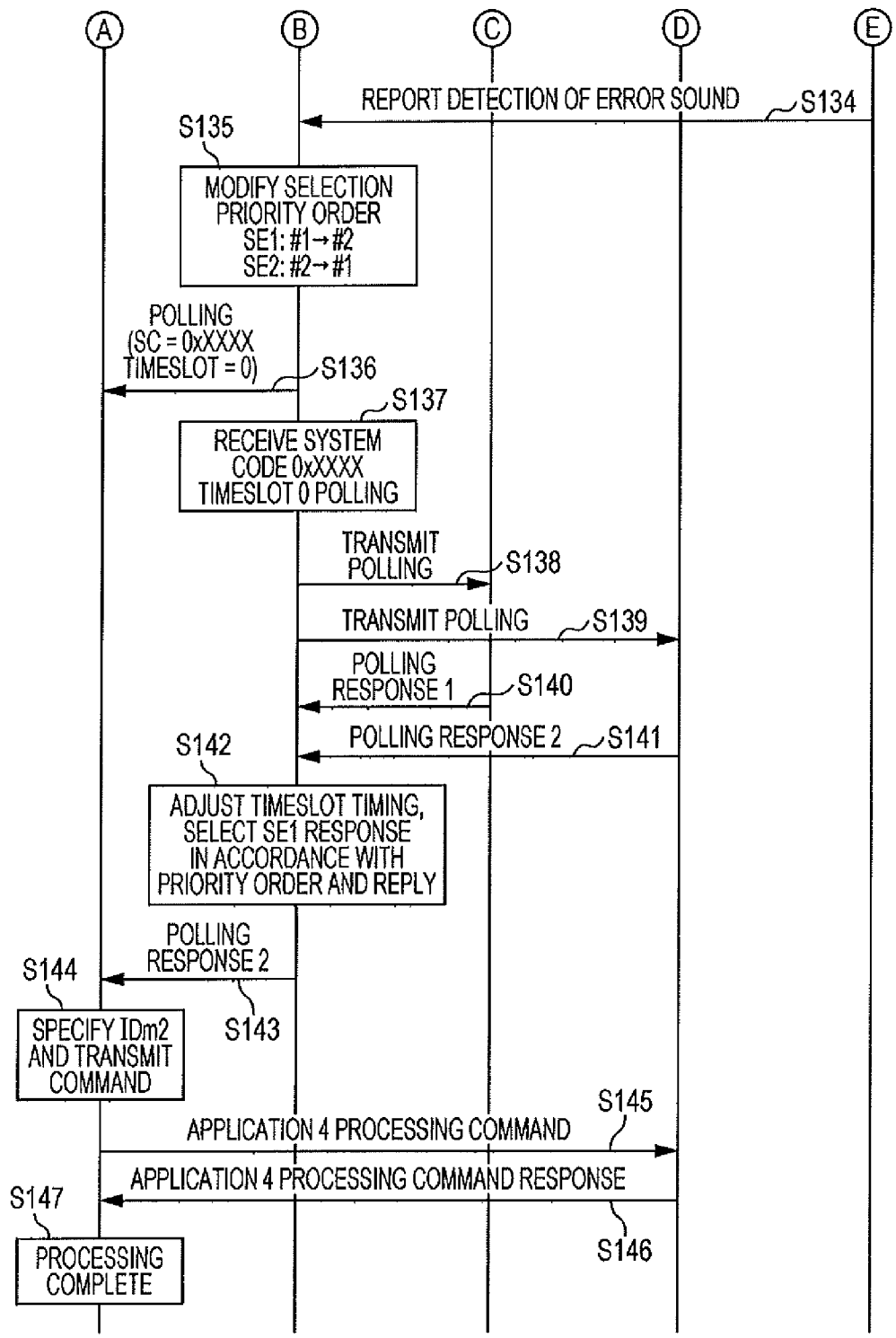
FIG. 13B is a flowchart explaining a suitable secure element selection method by an RF chip based on error sound detection in the mobile terminal illustrated in FIGS. 12A and 12B.

FIGS. 13A and 13B are flowcharts explaining a suitable secure element selection method by an RF chip 120 based on error sound detection in the mobile terminal 100 illustrated in FIG. 12. Hereinafter, FIGS. 13A and 13B will be used to explain a suitable secure element selection method by an RF chip 120 based on error sound detection. It is presumed that in the mobile terminal 100 illustrated in FIG. 12, the secure element 140a has been set to priority order #1 in advance in the RF chip 120. Additionally, it is presumed that the user of the mobile terminal 100 is trying to complete a product purchase by using an application in the mobile terminal 100.

A polling command for a given system code ("0xFFFF", for example) with a timeslot of 0 is emitted from a reader-writer 10 (step S121). The RF chip 120 of the mobile terminal 100 receives the polling command transmitted from the reader-writer 10 via the antenna coil 110 (step S212).

If the RF chip 120 receives a polling command from the reader-writer 10 in the above step S122, the RF chip 120 forwards the received polling command to the secure elements 140a and 140b, respectively (steps S123 and S124). The secure elements 140a and 140b, having received the polling command forwarded from the RF chip 120, reply to the RF chip 120 with a response to the polling command (steps S125 and S126).

The RF chip 120, having received responses to the polling command from the secure elements 140a and 140b, selects the response of the secure element 140a, since the secure element 140a has been set to priority order #1 in advance (step S127). The RF chip 120 then adjusts the timeslot timing and replies to the reader-writer 10 with the response from the secure element 140a (step S128).

The reader-writer 10, having received the response from the mobile terminal 100, specifies the IDm of the secure element 140a (IDm1), and transmits an Application 4 processing command (a command requesting a transaction) (step S129). The Application 4 processing command transmitted from the reader-writer 10 is forwarded to the secure element 140a via the antenna coil 110 and the RF chip 120 (step S130). The secure element 140a, having received the Application 4 processing command from the reader-writer 10, replies with a response to the command (step S131). The reply from the secure element 140a is sent to the reader-writer 10 via the RF chip 120 and the antenna coil 110.

The reader-writer 10, having received a response from the secure element 140a, processes Application 4 on the basis of the response, but as illustrated in FIG. 12, a balance of 0 yen is recorded in "Application 4" of the secure element 140a. Consequently, the transaction is not completed due to insufficient funds, even if the user of the mobile terminal 100 tries to complete a product purchase by just waving the mobile terminal 100 over the reader-writer 10. Consequently, since insufficient funds for a purchase occurs in the reader-writer 10, the reader-writer 10 produces a given error sound for insufficient funds (step S132).

When the reader-writer 10 produces a given error sound for insufficient funds, the error sound is picked up by the mobile terminal 100. The picked up error sound is detected by the device host 130 (step S133).

The device host 130, upon detecting the error sound in the above step S133, reports to the RF chip 120 that an error sound was detected (step S134). The RF chip 120, having received a report from the device host 130 indicating that an error sound was detected, re-sets the priority order of the secure element 140b to #1 and the priority order of the secure element 140a to #2 (step S135).

After that, a polling command for a given system code ("0xFFFF", for example) with a timeslot of 0 is again emitted from the reader-writer 10 (step S136), and the RF chip 120 of the mobile terminal 100 receives the polling command transmitted from the reader-writer 10 via the antenna coil 110 (step S137).

When the RF chip 120 receives a polling command from the reader-writer 10 in the above step S137, the RF chip 120 forwards the received polling command to the secure elements 140a and 140b, respectively (steps S138 and S139). The secure elements 140a and 140b, having received the polling command forwarded from the RF chip 120, reply to the RF chip 120 with responses to the polling command (steps S140 and S141).

The RF chip 120, having received responses to the polling command from the secure elements 140a and 140b, selects the response of the secure element 140b since the secure element 140b is set to priority order #1 due to the re-setting of the priority order set in the above step S135 (step S142). The RF chip 120 then adjusts the timeslot timing and replies to the reader-writer 10 with the response from the secure element 140b (step S143).

The reader-writer 10, having received a response from the mobile terminal 100, specifies the IDm of the secure element 140b (IDm2), and transmits an Application 4 processing command (a command requesting a transaction) (step S144). The Application 4 processing command transmitted from the reader-writer 10 is forwarded to the secure element 140b via the antenna coil 110 and the RF chip 120 (step S145). The secure element 140b, having received the Application 4 processing command from the reader-writer 10, replies with a response to the command (step S146). The reply from the secure element 140b is sent to the reader-writer 10 via the RF chip 120 and the antenna coil 110.

The reader-writer 10, having received a response from the secure element 140b, processes Application 4 on the basis of the response. As illustrated in FIG. 12, a balance of 1000 yen is recorded in "Application 4" of the secure element 140b. Since this is more than the price sought by the transaction, the "Application 4" in the reader-writer 10 deducts the product price from the secure element 140b and completes the product purchase transaction process (step S147).

In this way, if processing by an application recorded on a secure element with a high priority order fails in the case where the same application is respectively recorded in a plurality of secure elements 140a and 140b housed in a mobile terminal 100, then the RF chip 120 automatically switches the secure element priority order based on detection of an error sound. In so doing, the secure element priority order is automatically switched without the user of the mobile terminal 100 manually issuing instructions to switch the secure element priority order. Thus, processing is conducted smoothly when the mobile terminal 100 is waved over the reader-writer 10.

[1-4-6. Prioritization Among Identical Applications]

Figure 14:
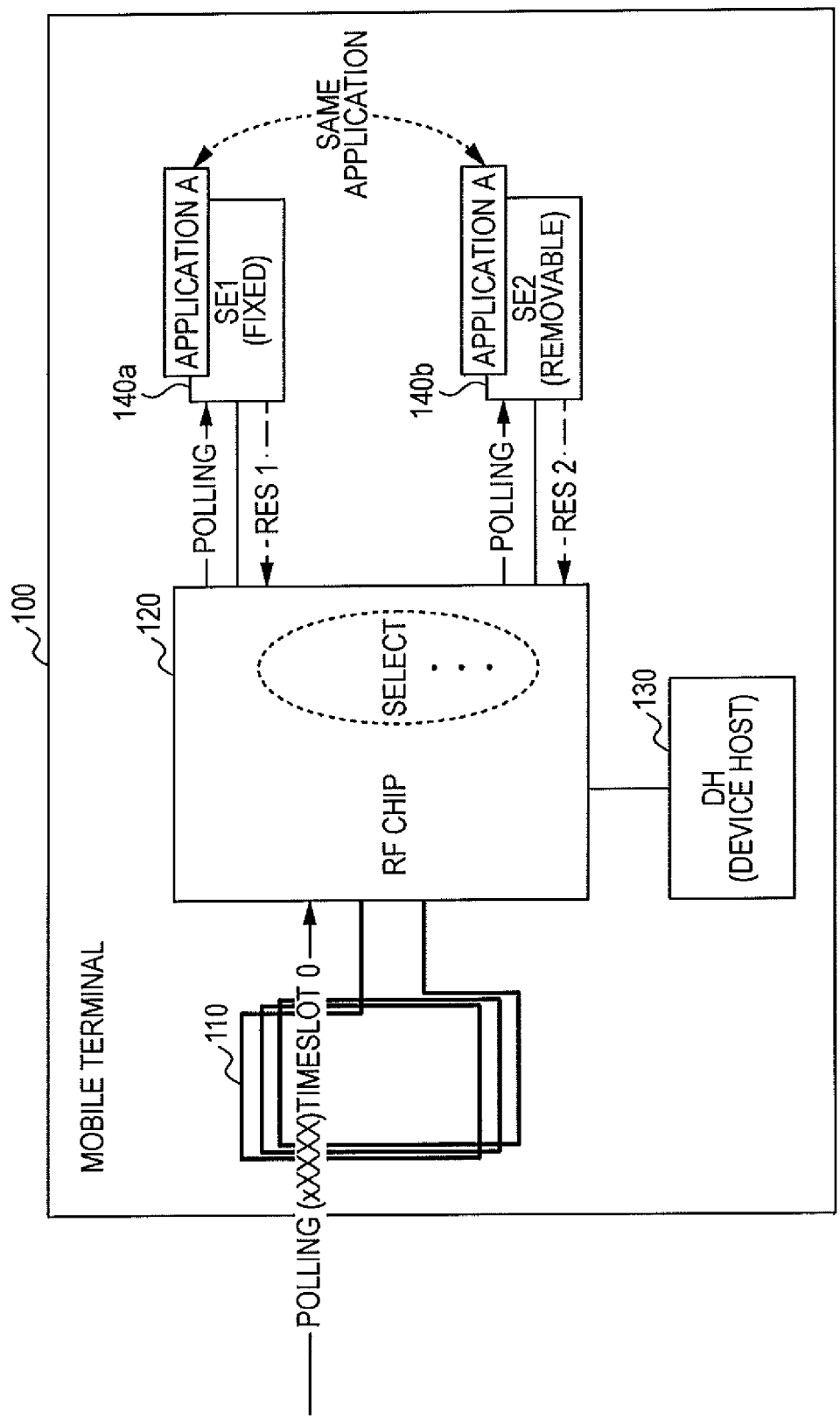
FIG. 14 is an explanatory diagram illustrating a configuration of a mobile terminal in which the same application is recorded in different secure elements.

In this way, there are cases where the same application is recorded in different secure elements in a mobile terminal 100. FIG. 14 is an explanatory diagram illustrating a configuration of a mobile terminal 100 in which the same application is recorded in different secure elements 140a and 140b. When the timeslot is 0, the IDm of one of the secure elements should be selected to reply, even if a system code is specified in a polling command of a reader-writer 10. Since a fixed secure element is selected with priority in the technology in the above Japanese Unexamined Patent Application Publication No. 2009-147845, a response of the secure element 140a is selected in the example of the mobile terminal 100 illustrated in FIG. 14.

However, the application in the secure elements 140a and 140b may have electronic money functions, with the electronic money balance being 0 yen for the secure element 140a and 1000 yen for the secure element 140b, for example. If the value of the fixed secure element 140a is selected in this case, a problem may occur in that a transaction may not be completed, even though money is charged to the secure element 140b.

Thus, in the present embodiment, in order to select an optimal secure element in a state where the same application is recorded on different secure elements 140a and 140b, information on applications present in secure elements and IDm or other information is stored the non-volatile memory 123 of the RF chip 120. Next, the RF chip 120 uses information stored in the non-volatile memory 123 and information on the applications in the secure elements 140a and 140b to select one of the responses from the secure elements 140a and 140b, and replies to the reader-writer 10 with respect to the polling command. At this point, a method for selecting one of the responses from the secure elements 140a and 140b on the basis of balance information in the applications in the secure elements 140a and 140b will be explained.

Figure 15:
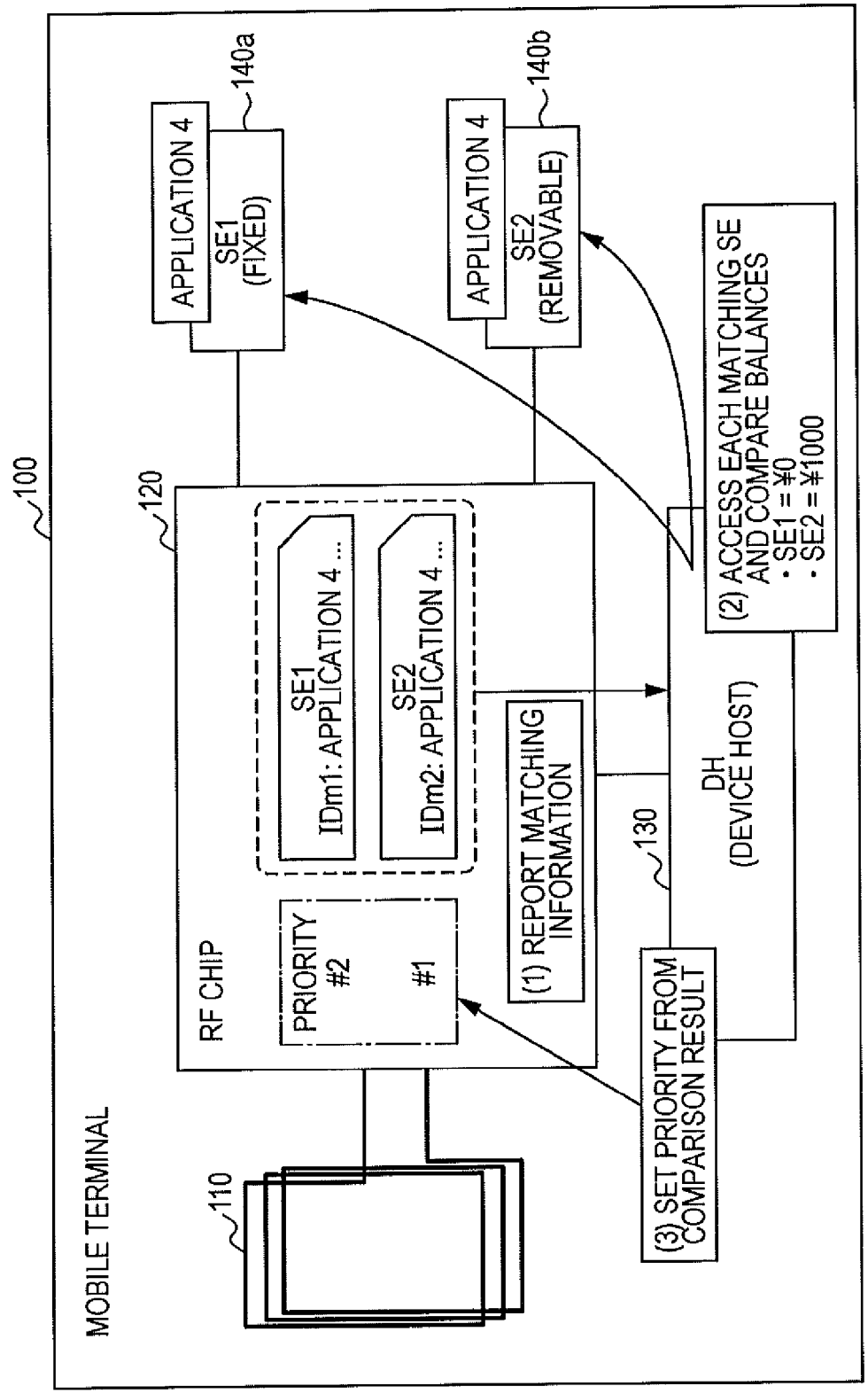
FIG. 15 is an explanatory diagram illustrating operation of a mobile terminal when setting secure element priority with an RF chip in the case where the same application is recorded in different secure elements.

FIG. 15 is an explanatory diagram illustrating operation of a mobile terminal 100 when setting secure element priority with an RF chip 120 in the case where the same application is recorded in different secure elements 140a and 140b. Hereinafter, FIG. 15 will be used to explain operation of a mobile terminal 100 when setting secure element priority with an RF chip 120 in the case where the same application is recorded in different secure elements 140a and 140b.

The RF chip 120 stores information on applications present in each secure element and IDm or other information from the secure elements 140a and 140b in the non-volatile memory 123 of the RF chip 120 in advance. If the RF chip 120 confirms that the same application is present in different secure elements as a result of acquiring information from the secure elements 140a and 140b, the RF chip 120 reports information to the device host 130 indicating that the same application is present in different secure elements.

The device host 130, having received information indicating that the same application is present in different secure elements, directly accesses the secure elements 140a and 140b, acquires the respective current balance information from the secure elements 140a and 140b, and compares the balances. Obviously, the device host 130 may also acquire respective current balance information from the secure elements 140a and 140b via the RF chip 120.

From the balance comparison result, the device host 130 instructs the RF chip 120 to prioritize such that the secure element with the higher balance is given a higher priority order. The RF chip 120, having received instructions from the device host 130, sets the priority order of the secure element 140b to #1 and the priority order of the secure element 140a to #2, respectively.

Thus, by raising the priority order of the secure element with the higher balance in advance before conducting a product purchase transaction using secure elements 140a and 140b, a payment error situation due to insufficient funds is avoided when conducting a product purchase transaction with electronic money functions, and processing is conducted smoothly when the mobile terminal 100 is waved over the reader-writer 10.

Figure 16:
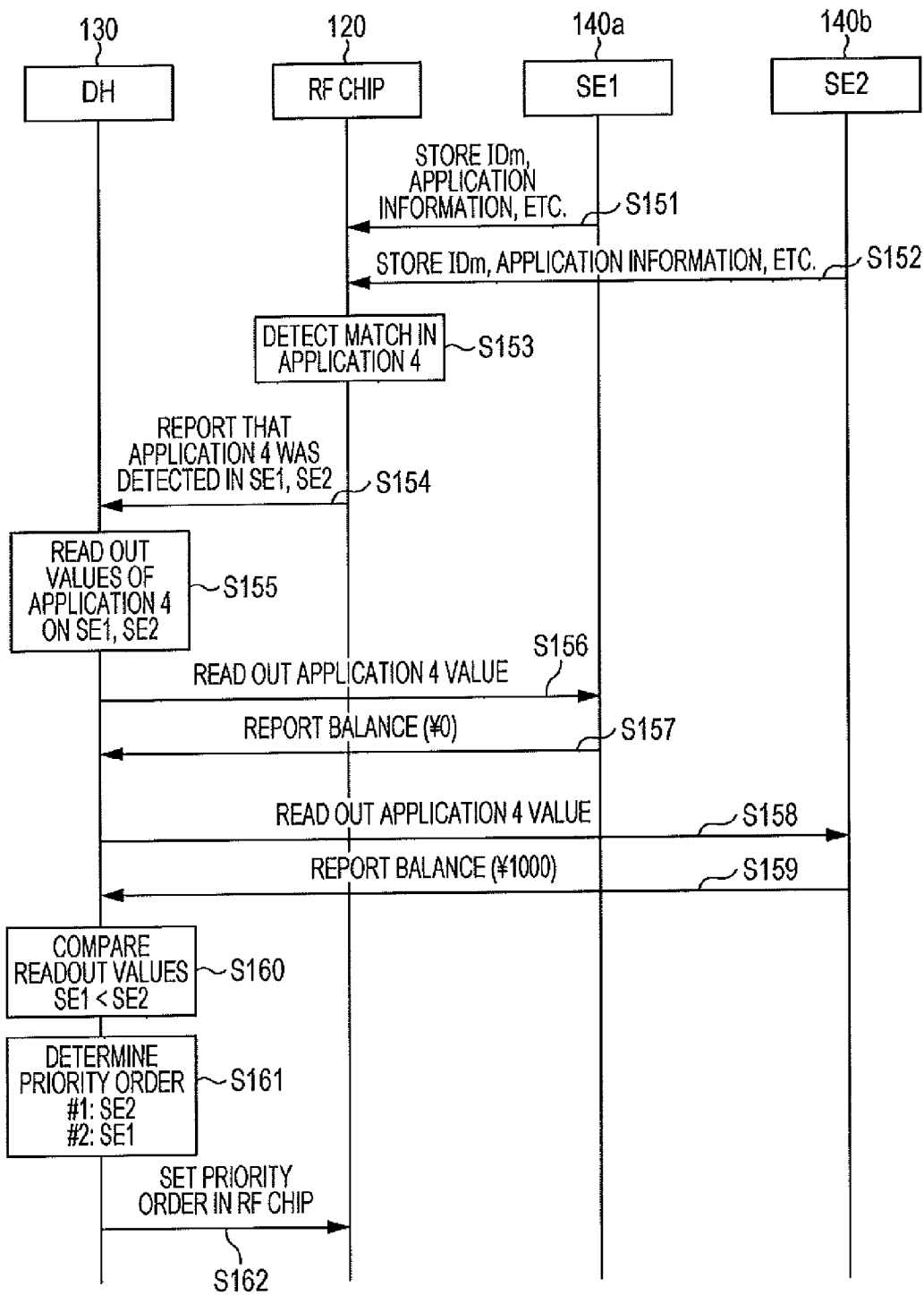
FIG. 16 is a flowchart illustrating operation of a mobile terminal when setting secure element priority with an RF chip in the case where the same application is recorded in different secure elements.

FIG. 16 is a flowchart illustrating operation of a mobile terminal 100 when setting secure element priority with an RF chip 120 in the case where the same application is recorded in different secure elements 140a and 140b. Hereinafter, FIG. 16 will be used to explain detailed operation of a mobile terminal 100 when setting secure element priority with an RF chip 120 in the case where the same application is recorded in different secure elements 140a and 140b.

First, during manufacturing of a mobile terminal 100 or when a secure element 140b that is removable from a mobile terminal 100 is installed in a mobile terminal 100 or at some other timing, the RF chip 120 acquires IDm information on the secure elements 140a and 140b and information on applications retained by each secure element, and stores the information in the non-volatile memory 123 (steps S151 and S152).

When the RF chip 120 acquires IDm information on the secure elements 140a and 140b and application information, it can be determined whether or not the applications retained by the secure elements 140a and 140b match. Then, if it is detected that the applications retained by the secure elements 140a and 140b match (step S153), the RF chip 120 reports to the device host 130 that the secure elements 140a and 140b are retaining the same application (step S154).

The device host 130, having received a report from the RF chip 120 indicating that the secure elements 140a and 140b are retaining the same application, initiates a process to read out values (balance information) of the applications retained by the secure elements 140a and 140b (step S155). The device host 130 first accesses the secure element 140a and reads out the value (balance information) of the application retained by the secure element 140a (step S156), and the secure element 140a reports the application value (balance information) to the device host 130 (step S157). Next, the device host 130 accesses the secure element 140b and reads out the value (balance information) of the application retained by the secure element 140b (step S158), and the secure element 140b reports the application value (balance information) to the device host 130 (step S159).

Once application values are respectively acquired from the secure elements 140a and 140b, the device host 130 subsequently compares the magnitudes of the acquired values (step S160). Then, the device host 130 determines a secure element priority order on the basis of the magnitude comparison result for the acquired values (step S161). In this example, since the secure element 140b has a higher balance, it is determined that the secure element 140b has priority order #1 and the secure element 140a has priority order #2, respectively.

The device host 130 then reports the determined priority order settings to the RF chip 120 (step S162). The RF chip 120 prioritizes the secure elements 140a and 140b on the basis of the report from the device host 130.

In this way, by raising the priority order of the secure element with the higher balance in advance before conducting a product purchase transaction using secure elements 140a and 140b, a payment error situation due to insufficient funds is avoided when conducting a product purchase transaction with electronic money functions, and processing is conducted smoothly when a mobile terminal 100 is waved over a reader-writer 10.

In the example discussed above, the priority order of the secure element with the higher balance is raised in advance before conducting a product purchase transaction using secure elements 140a and 140b. However, the present technology is not limited to such an example. For example, in the case where the user of the mobile terminal 100 wants to first use the lower balance, it may also be configured such that the priority order of the secure element with a lower balance of 1 yen or more may be raised depending on settings.

The foregoing explains a secure element prioritization method by an RF chip 120 by giving multiple examples, but it is needless to say that a secure element prioritization method by an RF chip 120 is not limited to the examples discussed above. Also, it is needless to say the examples discussed above are not limited to cases of being used individually, as it may also be configured such that secure element prioritization is conducted by an RF chip 120 by combining multiple examples.

Otherwise, it may also be configured such that a secure element application is specified by using position information (GPS, Wi-Fi, etc.) implemented in a mobile terminal 100, for example. It may also be configured such that the priority order of replying secure elements is modified by issuing a report to the RF chip 120 specifying the application of the closest reader-writer based on information able to specify the user's current location, such as GPS or Wi-Fi implemented in a mobile phone, PDA, or other mobile terminal 100. The secure element priority order may also be modified server-side by utilizing a Wi-Fi or other network.

2. CONCLUSION

According to an embodiment of the present technology as explained above, in the case where a plurality of secure elements are housed in a mobile terminal 100, an RF chip 120 automatically executes prioritization of the secure element that should reply to a reader-writer 10 on the basis of IDm, application, or other information belonging to the secure elements, whether a secure element is fixed to the mobile terminal 100 or removable from the mobile terminal 100.

The RF chip 120 automatically executes secure element prioritization by using various information and the surrounding environment. For example, the RF chip 120 is able to conduct secure element prioritization in advance before the mobile terminal 100 is waved over a reader-writer 10 by short-range radio communication having a wider communication range than near field contactless communication, modify the secure element priority order depending on the time of day, and modify the secure element priority order according to image recognition or audio recognition.

Also, according to an embodiment of the present technology, in the case where a plurality of secure elements are housed in a mobile terminal 100 and the same application is recorded in multiple secure elements, it is detected in advance that the same application is recorded in multiple secure elements, and secure element prioritization is automatically executed by the RF chip 120 on the basis of the respective application values (such as balance information, for example).

In this way, by automatically determining the priority order of the secure element to respond to a reader-writer 10 in the case where a plurality of secure elements are housed in the mobile terminal 100, smooth near field contactless communication between a reader-writer 10 and a mobile terminal 100 becomes possible whether a secure element is fixed to the mobile terminal 100 or removable from the mobile terminal 100.

Meanwhile, it may also be configured such that a secure element priority order once set is left as-is until a modification timing is subsequently reached. Alternatively, in the combination with RFID discussed earlier, for example, the RF chip 120 sets a secure element priority order when the mobile terminal 100 enters the communication range of short-range radio communication. If the mobile terminal 100 then leaves the communication range of short-range radio communication, the RF chip 120 may revert the secure element priority order to the previous order.

The foregoing thus explains preferred embodiments of the present technology in detail and with reference to the attached drawings, but the present technology is not limited to such examples. It should be understood by those ordinarily skilled in the art to which the present technology belongs that various modifications and alterations may occur within the scope of the technical ideas described in the claims, and that such matter obviously also falls under the technical scope of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal comprising:
a plurality of memory units configured to store a first information to be transmitted to an external communication apparatus;
a radio communication unit configured to receive a second information from the external communication apparatus via radio communication, wherein a first memory unit from the plurality of memory units is selected based on the second information received via the radio communication unit;
a contactless communication unit configured to conduct contactless communication with the external communication apparatus to transmit the first information from the selected first memory unit to the external communication apparatus, wherein the contactless communication is different from the radio communication;
a controller configured to control a data transmission abetween the selected first memory unit and the external communication apparatus; and
an audio recognition unit configured to execute audio recognition processing,
wherein when a specific error is detected during the contactless communication with the external communication apparatus, the audio recognition unit recognizes a given sound associated with the specific error produced by the external communication, and the controller modifies a priority order of the plurality of memory units on receiving an indication that the audio recognition unit has recognized the given sound.

2. The mobile terminal according to claim 1, wherein the plurality of memory units are tamper-resistant.

3. The mobile terminal according to claim 1, wherein the controller is further configured to select a second memory unit different from the selected first memory unit for the data transmission when a specific error is detected.

4. The mobile terminal according to claim 1, wherein the controller is further configured to select a second memory unit different from the selected first memory unit for the data transmission based on referencing values stored in the plurality of memory units.

5. The mobile terminal according to claim 1, wherein the controller is further configured to select a second memory unit different from the selected first memory unit for the data transmission based on referencing balance information stored in the plurality of memory units.

6. The mobile terminal according to claim 1, wherein the controller is further configured to set a priority order of the plurality of memory units for the data transmission.

7. The mobile terminal according to claim 1, further comprising:
an image recognition unit configured to execute an image recognition processing when conducting the contactless communication with the external communication apparatus,
wherein the controller sets a priority order of the plurality of memory units based on the image recognition processing.

8. The mobile terminal according to claim 7, wherein the image recognition processing is executed to recognize a logo associated with the external communication apparatus.

9. The mobile terminal according to claim 1, wherein when the plurality of memory units are associated with a similar application, the controller sets a priority order of the plurality of memory units based on a referencing value stored in each of the plurality of memory units.

10. The mobile terminal according to claim 1, wherein the controller sets a priority order of the plurality of memory units based on referencing balance information stored in each of the plurality of memory units, such that a memory unit with a higher balance is given a higher priority.

11. The mobile terminal according to claim 1, wherein the second information is received from the external communication apparatus prior to conducting the contactless communication with the external communication apparatus via radio communication.

12. The mobile terminal according to claim 1, wherein range of the radio communication is greater than range of the contactless communication.

13. The mobile terminal according to claim 1, wherein the second information received from the external communication apparatus is related to an application for which the contactless communication is desired from the external communication apparatus.

14. The mobile terminal according to claim 1, further comprising:
a sound pick up device,
wherein the controller is configured to control the data transmission between a third memory unit selected from the plurality of the memory units and the external communication apparatus, wherein the third memory unit is selected based on an audio input received by the sound pick-up device.

15. The mobile terminal according to claim 1, wherein the controller is further configured to set a priority order of the plurality of memory units based on current time.

16. The mobile terminal according to claim 1, wherein the contactless communication is conducted when the mobile terminal is disposed near the external communication apparatus.

17. A method comprising:
storing a first information to be transmitted to an external communication apparatus in each of a plurality of memory units;
receiving a second information from the external communication apparatus via radio communication, wherein a first memory unit from the plurality of memory units is selected based on the second information received via the radio communication;
conducting contactless communication with the external communication apparatus to transmit the first information from the selected first memory unit to the external communication apparatus, wherein the contactless communication is different from the radio communication;
controlling data transmission between the selected first memory unit and the external communication apparatus;

executing audio recognition processing;

recognizing a given sound produced by the external communication apparatus when a specific error is detected during the contactless communication with the external communication apparatus; and modifiying a priority order of the plurality of memory units on receiving an indication that the given sound associated with the specific error is recognized.

18. The method of claim 17, wherein a second memory unit different from the selected first memory unit is selected when a specific error is detected.

19. The method of claim 17, wherein a second memory unit different from the selected first memory unit is selected for data transmission between the selected second memory unit and the external communication apparatus based on referencing values stored in the plurality of memory units.

20. The method of claim 17, wherein a second memory unit different from the selected first memory unit is selected for data transmission between the selected second memory unit and the external communication apparatus based on referencing balance information stored in the plurality of memory units.

21. The method of claim 17, further comprising setting a priority order of the plurality of memory units for data transmission between one of the plurality of memory units and the external communication apparatus.

22. The method of claim 17, further comprising:

executing an image recognition processing when conducting the contactless communication with the external communication apparatus; and setting a priority order of the plurality of memory units based on the image recognition processing.

23. The method of claim 22, wherein the image recognition processing is executed to recognize a logo associated with the external communication apparatus.

24. The method of claim 17, wherein when the plurality of memory units are associated with a similar application, a priority order of the plurality of memory units is set based on referencing value stored in each of the plurality of memory units.

25. The method of claim 24, wherein the priority order is set based on referencing balance information stored in each of the plurality of memory units, such that a memory unit with a higher balance is given a higher priority.

26. The method of claim 17, wherein the second information is received from the external communication apparatus prior to conducting the contactless communication with the external communication apparatus via radio communication.

27. A non-transitory computer readable storage medium having stored thereon, a computer program having at least one code section executable by a computer, thereby causing the computer to perform the steps comprising:

storing a first information to be transmitted to an external communication apparatus in each of a plurality of memory units;

receiving a second information from the external communication apparatus via radio communication, wherein a first memory unit from the plurality of memory units is selected based on the second information received via the radio communication;

conducting contactless communication with the external communication apparatus to transmit the first information from the selected first memory unit to the external communication apparatus, wherein the contactless communication is different from the radio communication;

controlling data transmission between the selected first memory unit and the external communication apparatus;

executing audio recognition processing;

recognizing a given sound produced by the external communication apparatus when a specific error is detected during the contactless communication with the external communication apparatus; and modifiying a priority order of the plurality of memory units on receiving an indication that the given sound associated with the specific error is recognized.

\* \* \* \* \*